United States Patent
Lee et al.

(10) Patent No.: US 11,417,441 B2
(45) Date of Patent: Aug. 16, 2022

(54) METHOD OF INTERCONNECTING NANOWIRES, NANOWIRE NETWORK AND TRANSPARENT CONDUCTIVE ELECTRODE

(71) Applicant: Kuprion Inc., San Jose, CA (US)

(72) Inventors: Byung Hoon Lee, Singapore (SG); Chee Lip Gan, Singapore (SG); Yeng Ming Lam, Singapore (SG); Alfred A. Zinn, Palo Alto, CA (US)

(73) Assignee: Kuprion Inc., San Jose, CA (US)

( * ) Notice: Subject to any disclaimer, the term of this patent is extended or adjusted under 35 U.S.C. 154(b) by 124 days.

(21) Appl. No.: 16/871,315

(22) Filed: May 11, 2020

(65) Prior Publication Data
US 2020/0273595 A1   Aug. 27, 2020

Related U.S. Application Data

(62) Division of application No. 15/547,437, filed as application No. PCT/SG2016/050043 on Jan. 29, 2016.

(60) Provisional application No. 62/109,776, filed on Jan. 30, 2015.

(51) Int. Cl.
| | |
|---|---|
| *H01B 1/02* | (2006.01) |
| *B82Y 40/00* | (2011.01) |
| *B82Y 30/00* | (2011.01) |
| *B82B 3/00* | (2006.01) |
| *H01B 1/22* | (2006.01) |
| *H01B 13/00* | (2006.01) |

(52) U.S. Cl.
CPC .......... *H01B 1/026* (2013.01); *B82B 3/0047* (2013.01); *B82Y 30/00* (2013.01); *B82Y 40/00* (2013.01); *H01B 1/22* (2013.01); *H01B 13/0016* (2013.01)

(58) Field of Classification Search
CPC ....... B82B 3/0047; B82Y 30/00; B82Y 40/00; H01B 1/028; H01B 1/22; H01B 13/0016
See application file for complete search history.

(56) References Cited

U.S. PATENT DOCUMENTS

| | | | | |
|---|---|---|---|---|
| 8,105,414 | B2 * | 1/2012 | Zinn | B22F 9/24 75/255 |
| 2011/0127464 | A1 * | 6/2011 | Zinn | B22F 1/0018 252/182.12 |
| 2014/0290987 | A1 * | 10/2014 | Yang | H05K 1/09 174/253 |
| 2016/0038909 | A1 * | 2/2016 | Choy | H01B 1/02 174/126.1 |

FOREIGN PATENT DOCUMENTS

| | | | |
|---|---|---|---|
| CN | 102544223 B | * | 4/2014 |
| KR | 1020140139390 A | * | 12/2014 |

* cited by examiner

*Primary Examiner* — Carl J Arbes
(74) *Attorney, Agent, or Firm* — Vorys, Sater, Seymour and Pease LLP

(57) ABSTRACT

According to embodiments of the present invention, a method of interconnecting nanowires is provided. The method includes providing a plurality of nanowires, providing a plurality of nanoparticles, and fusing the plurality of nanoparticles to the plurality of nanowires to interconnect the plurality of nanowires to each other via the plurality of nanoparticles. According to further embodiments of the present invention, a nanowire network and a transparent conductive electrode are also provided.

10 Claims, 18 Drawing Sheets

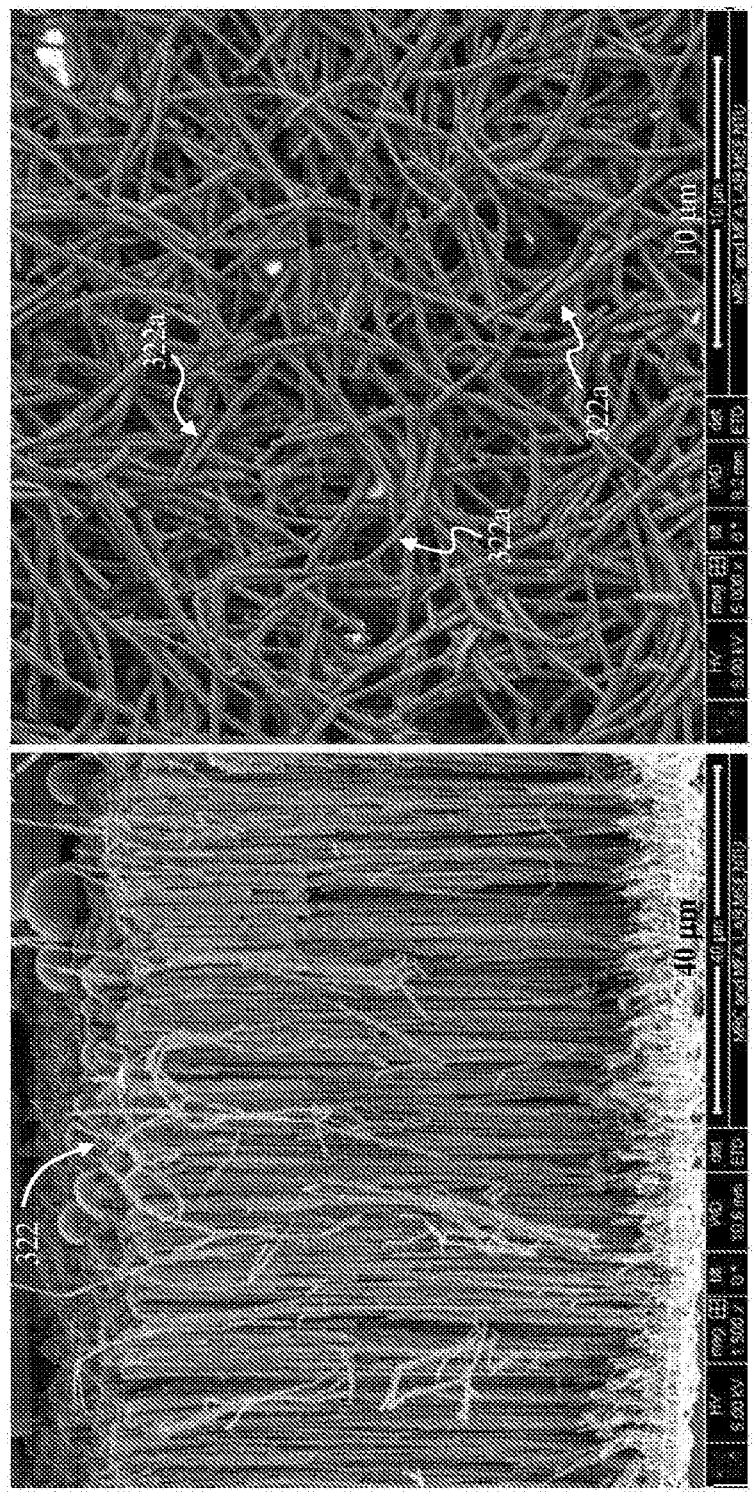

METHOD OF INTERCONNECTING NANOWIRES, NANOWIRE NETWORK AND TRANSPARENT CONDUCTIVE ELECTRODE

CROSS-REFERENCE TO RELATED APPLICATION

The present application is a divisional of U.S. patent application Ser. No. 15/547,437, filed on Jul. 28, 2017, which is a 35 U.S.C. 371 national stage application of PCT/SG2016/050043, filed on Jan. 29, 2016, which claims the benefit of priority under 35 U.S.C. 119 from U.S. Provisional Patent Application 62/109,776, filed on Jan. 30, 2015, each of which is incorporated herein by reference in its entirety.

TECHNICAL FIELD

Various embodiments relate to a method of interconnecting nanowires, a nanowire network and a transparent conductive electrode.

Indium tin oxide (ITO) has been the most commonly used material as a transparent electrode for flat panel displays. However, it has some drawbacks: it cannot be used for flexible displays which is the next generation of display due to its brittle nature, as well as the dwindling supply of indium.

Recently, nanomaterials such as metallic silver (Ag) nanowires, carbon nanotubes (CNT) and graphene have been investigated as potential replacement materials for transparent electrodes on flexible substrates instead of ITO. A number of studies have been carried out using a network of Ag nanowires as an electrode material. However, the cost of Ag itself is high and is comparable with the cost of ITO. On the other hand, copper (Cu) is an abundant and cheap material, and is the dominant metal used as an electrical conductor. It has a high electrical conductivity and is used as an electrode in conventional electronics. Though it has many advantages, Cu cannot be used as a transparent electrode in its current form due to some of the reasons as listed below.

- It is difficult to use Cu with other materials because Cu usually reacts with other metals very aggressively to form intermetallic compounds which degrade its properties.
- Cu oxidizes in ambient condition, and more severely at higher temperatures. The melting temperature of Cu (1084° C.) is much higher than the processing temperature (<250° C.) of transparent electrodes on typical flexible substrates, e.g., Polyimide (PI, $T_g$: 340° C.), Polycarbonate (PC, $T_g$: 156° C.), Polyethersulfone (PES, $T_g$: 223° C.), Polyethyleneterephthalate (PET, $T_g$: 78° C.), Polyethylenenaphthalate (PEN, $T_g$: 121° C.), Polyarylate (PAR, $T_g$: 350° C.).

SUMMARY

According to an embodiment, a method of interconnecting nanowires is provided. The method may include providing a plurality of nanowires, providing a plurality of nanoparticles, and fusing the plurality of nanoparticles to the plurality of nanowires to interconnect the plurality of nanowires to each other via the plurality of nanoparticles.

According to an embodiment, a nanowire network is provided. The nanowire network may include a plurality of nanowires interconnected to each other via a plurality of nanoparticles fused to the plurality of nanowires.

According to an embodiment, a transparent conductive electrode is provided. The transparent conductive electrode may include a nanowire network, the nanowire network including a plurality of conductive nanowires interconnected to each other via a plurality of conductive nanoparticles fused to the plurality of conductive nanowires.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIGS. 3A and 3B show scanning electron microscope (SEM) images of copper nanowires (Cu NWs) after manufacturing and after dispersion on a substrate respectively.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Figure 1A:
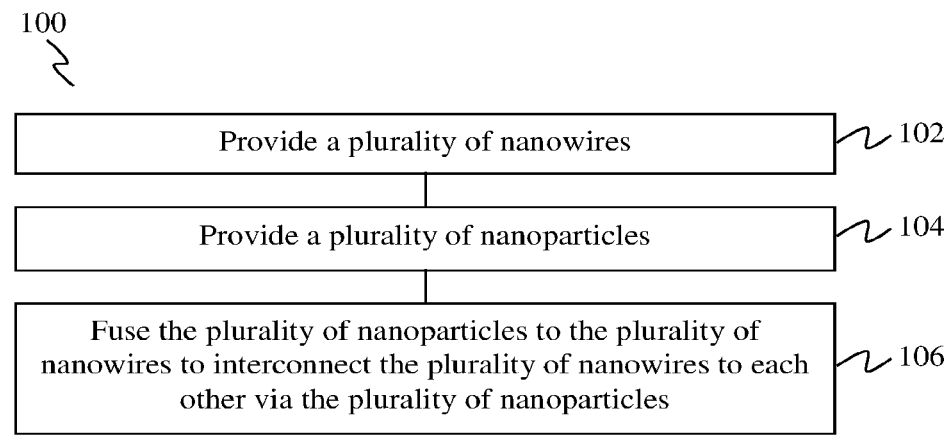
FIG. 1A shows a flow chart illustrating a method of interconnecting nanowires, according to various embodiments.

FIG. 1A shows a flow chart 100 illustrating a method of interconnecting nanowires, according to various embodiments.

At 102, a plurality of nanowires (NWs) are provided.

At 104, a plurality of nanoparticles (NPs) are provided.

At 106, the plurality of nanoparticles are fused to the plurality of nanowires to interconnect the plurality of nanowires to each other via the plurality of nanoparticles.

In various embodiments, the plurality of nanoparticles may be fused to and in between the plurality of nanowires to interconnect the plurality of nanowires to each other via the plurality of nanoparticles, for example, at the junctions between the plurality of nanowires. This may mean that nanoparticles may be present at a joint or junction between two nanowires to fuse the two nanowires to each other. Therefore, two nanowires may be fused together with nanoparticles at a junction so that the two nanowires may be interconnected to each other via the nanoparticles at the junction.

In other words, the plurality of nanowires may be fused to each other through the plurality of nanoparticles. This may mean that the plurality of nanowires may be interconnected to each other by means of the plurality of nanoparticles, rather than direct nanowire-nanowire joints.

In various embodiments, the nanoparticles may also be fused to each other.

In various embodiments, the plurality of nanowires and the plurality of nanoparticles may be made of the same material (e.g., metal), which may encourage reaction between the nanowires and the nanoparticles.

In various embodiments, at 106, in order to fuse the plurality of nanoparticles to the plurality of nanowires, the plurality of nanowires and the plurality of nanoparticles may be subjected to a heating process. This may mean that a heat treatment may be carried out to fuse the plurality of nanoparticles to (and in between) the plurality of nanowires.

The heating process may be carried out at a predetermined temperature of about 250° C. or less (i.e., ≤250° C.), for example, between about 100° C. and about 250° C., or between about 120° C. and about 250° C. Therefore, a low temperature processing method (<250° C.) may be provided.

The heating process may be carried out for a predetermined duration of between about 6 minutes and about 60 minutes, for example, between about 6 minutes and about 40 minutes, between about 6 minutes and about 20 minutes, between about 20 minutes and about 60 minutes, between about 40 minutes and about 60 minutes, or between about 10 minutes and about 30 minutes.

In various embodiments, a predetermined peak temperature of the heating process may be between about 200° C. and about 250° C., for example, between about 200° C. and about 220° C., between about 220° C. and about 250° C., or between about 230° C. and about 250° C., e.g., at about 250° C.

In various embodiments, the heating process at the predetermined peak temperature may be carried out for a predetermined duration of between about 90 seconds and about 30 minutes, for example, between about 90 seconds and about 20 minutes, between about 90 seconds and about 10 minutes, between about 10 minutes and about 30 minutes, or between about 5 minutes and about 10 minutes, e.g., for about 90 seconds.

In various embodiments, the plurality of nanowires and the plurality of nanoparticles may be mixed together prior to fusing the plurality of nanoparticles to the plurality of nanowires.

In the context of various embodiments, each nanoparticle of the plurality of nanoparticles may have a size (or diameter) of between about 5 nm and about 20 nm, for example, between about 5 nm and about 15 nm, between about 5 nm and about 10 nm, between about 10 nm and about 20 nm, or between about 8 nm and about 15 nm. The plurality of nanoparticles may have the same (or uniform) size (or diameter).

By having smaller sized nanoparticles (e.g., 5-20 nm, or <10 nm), the processing temperature of the heating process for fusing the plurality of nanoparticles to the plurality of nanowires may be lower (for example <250° C., e.g., between about 100° C. and about 250° C.) as compared to larger sized nanoparticles. For example, for nanoparticles with 40-100 nm diameter, the process temperature required may be in the range of 300-350° C. Further, smaller sized nanoparticles (e.g., 5-20 nm, or <10 nm) have been found to be preferentially deposited at junctions where nanowires come together.

In the context of various embodiments, each nanowire of the plurality of nanowires may have a length of between about 10 µm and about 50 µm, for example, between about 10 µm and about 40 µm, between about 10 µm and about 30 µm, between about 20 µm and about 30 µm, between about 20 µm and about 50 µm, between about 30 µm and about 50 µm, or between about 25 µm and about 40 µm. The plurality of nanowires may have the same (or uniform) length.

In the context of various embodiments, each nanowire of the plurality of nanowires may have a diameter of between about 20 nm and about 200 nm, for example, between about 20 nm and about 100 nm, between about 20 nm and about 50 nm, between about 50 nm and about 200 nm, between about 100 nm and about 200 nm, between about 100 nm and about 150 nm, between about 100 nm and about 120 nm, between about 150 nm and about 200 nm, or between about 120 nm and about 150 nm. The plurality of nanowires may have the same (or uniform) diameter.

In the context of various embodiments, each nanowire of the plurality of nanowires may have an aspect ratio of between about 50 and about 500, for example, between about 50 and about 250, between about 50 and about 100, between about 100 and about 500, or between about 100 and about 300. The term "aspect ratio" may mean the length-to-width ratio or length-to-diameter ratio.

In the context of various embodiments, a weight ratio of the plurality of nanowires to the plurality of nanoparticles is between about 5:1 and about 20:1, for example, between about 5:1 and about 10:1, between about 10:1 and about 20:1, or between about 10:1 and about 15:1, e.g., about 20:1. This may mean that the major/main constituent is the plurality of nanowires while the minor constituent is the plurality of nanoparticles. It should be appreciated that having more of the plurality of nanowires or the plurality of nanoparticles outside of the weight ratio as described above may encourage agglomeration of the nanowires and/or increase the processing temperature of the heating process for fusing the plurality of nanoparticles to the plurality of nanowires.

In various embodiments, at 102, the plurality of nanowires may be provided by forming the plurality of nanowires by means of an electroplating method using an anodic aluminum oxide (AAO) as a template. The anodic aluminum oxide (AAO) may include holes or pores or channels into which the material for the plurality of nanowires may be electroplated to form the plurality of nanowires. The plurality of nanowires may then be extracted or removed from the anodic aluminum oxide template. By employing an anodic aluminum oxide (AAO) (or anodized aluminum oxide (AAO)) as a template, a uniform distribution of the size (e.g., length and/or diameter) of the plurality of nanowires may be obtained.

In various embodiments, at 102, the plurality of nanowires may be dispersed in a solvent to form a solution including the plurality of nanowires, and, at 104, the plurality of nanoparticles may be added into the solution. The solvent may act as a dispersing agent to disperse the plurality of nanowires so as to minimize agglomeration of the plurality of nanowires. In this way, the solvent helps the plurality of nanowires to have mobility and dispersibility. Further, the solvent may help to carry, move or transfer the plurality of nanoparticles to the junction(s) of the plurality of nanowires. The plurality of nanoparticles may then be fused to the plurality of nanowires at such junction(s).

In various embodiments, at least some, or most, of the solvent may be removed, evaporated or volatized during the heating process for fusing the plurality of nanoparticles to the plurality of nanowires. The plurality of (small and light) nanoparticles, or at least some of them, may then get together at the junctions between the plurality of nanowires to find a position or spot where there may be lower surface energy.

In various embodiments, the heating temperature of the heating process is higher than the boiling point of the solvent.

In the context of various embodiments, the solvent may be a low viscosity liquid. As non-limiting examples, the solvent may include at least one of ethanol, methanol, isopropyl alcohol (IPA), or ethylene glycol.

In various embodiments, the method may further include depositing (or dispersing) the solution containing the plurality of nanowires and the plurality of nanoparticles on a substrate prior to fusing the plurality of nanoparticles to the plurality of nanowires. This may mean that fusing the plurality of nanoparticles to the plurality of nanowires, for example, by means of a heating process, may be carried out after the solution containing the plurality of nanowires and the plurality of nanoparticles has been deposited on a substrate. In various embodiments, the heating temperature of the heating process is lower than the transition temperature, Tg, of the substrate, but is higher than the boiling point of the solvent described above.

In various embodiments, the solution may be deposited on the substrate by at least one of spin coating, mayor bar coating, roll to roll coating or spraying (spray coating).

In the context of various embodiments, the substrate may include a porous substrate, for example, anodic aluminium oxide (AAO).

In the context of various embodiments, the substrate may include a flexible substrate.

In the context of various embodiments, the substrate may include an organic substrate.

In the context of various embodiments, the substrate may include at least one of polyimide (PI), polycarbonate (PC), polyethersulfone (PES), polyethyleneterephthalate (PET), polyethylenenaphthalate (PEN) or polyarylate (PAR).

In the context of various embodiments, the plurality of nanowires and the plurality of nanoparticles may be conductive (e.g., electrically conductive and/or thermally conductive).

In the context of various embodiments, the plurality of nanowires may include a metal and/or the plurality of nanoparticles may include a metal. The metal may be selected from the group consisting of copper (Cu), silver (Ag) and gold (Au). In various embodiments, the plurality of nanowires and the plurality of nanoparticles may include or may be made of the same metal.

In the context of various embodiments, the plurality of nanowires and the plurality of nanoparticles may include or consist essentially of copper (Cu).

In various embodiments, each nanowire of the plurality of nanowires may include a surfactant on a surface of the nanowire. The surfactant may prevent or minimize agglomeration of the plurality of nanowires. The surfactant may include a thiol (or thiol group) or an amine (or amine group). As non-limiting examples, the thiol group may include hexanethiol, octanethiol, decanethiol, dodecanethiol, etc. As non-limiting examples, the amine group may include hexylamine, octylamine, decylamine, dodecylamine, etc.

In other words, the plurality of nanowires may be treated to have a surfactant (e.g., thiol or amine) provided on the plurality of nanowires. The treatment with the surfactant may be carried out before mixing the plurality of nanowires with the plurality of nanoparticles. Generally, the process flow may be as follows: Nanowires (raw material)→Treatment with surfactant (e.g., thiol or amine)→Adding nanoparticles→Mixing the nanowires and the nanoparticles with a matrix (e.g., polymethylmethacrylate (PMMA))→Dispersing (coating), for example, onto a substrate-→Heating (annealing). The process of mixing with a matrix may be optional.

In various embodiments, each nanoparticle of the plurality of nanoparticles may be encapsulated with an organic layer. This may mean that each nanoparticle may be coated on its surface with an organic layer. Therefore, the organic layer may be a capping layer. The organic layer may prevent or minimize oxidation of the material of the nanoparticle. The organic layer may prevent or minimize agglomeration of the nanoparticles. The organic layer may be a polymeric layer. In various embodiments, the organic layer may be removed or volatized during the heating process for fusing the plurality of nanoparticles to the plurality of nanowires.

It should be appreciated that, in general, the method may include mixing→dispersing→heating, where the plurality of nanowires and the plurality of nanoparticles may be mixed (e.g., in a solvent), and then dispersed (e.g., on a substrate), followed by heating to fuse the plurality of nanoparticles to (and in between) the plurality of nanowires to interconnect the plurality of nanowires to each other via the plurality of nanoparticles.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

Figure 1B:
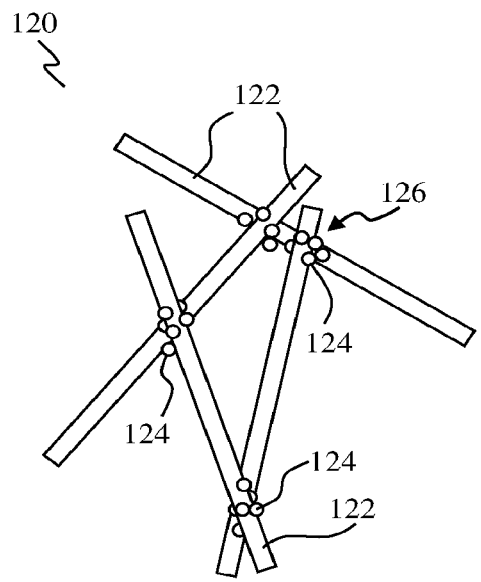
FIG. 1B shows a schematic top view of a nanowire network, according to various embodiments.

FIG. 1B shows a schematic top view of a nanowire network 120, according to various embodiments. The nanowire network 120 includes a plurality of nanowires 122 interconnected to each other via a plurality of nanoparticles 124 fused to the plurality of nanowires 122. This may mean that the nanowire network 120 may include interconnected nanowires 122.

In other words, a nanowire network (or network of interconnected nanowires) 120 may be provided. The nanowire network 120 may include a plurality of interconnected nanowires 122, and a plurality of nanoparticles 124 fused to the plurality of interconnected nanowires 122 such that the plurality of interconnected nanowires 122 are interconnected to each other via the plurality of nanoparticles 124.

In various embodiments, the plurality of nanoparticles 124 may be fused to and in between the plurality of nanowires 122 to interconnect the plurality of nanowires 122 to each other via the plurality of nanoparticles 124 at the junctions 126 between the plurality of nanowires 122. This may mean that nanoparticles 124 may be present at a joint or junction 126 between two nanowires 122 to fuse the two nanowires 122 to each other. Therefore, two nanowires 122 may be fused together with nanoparticles 124 at a junction 126 so that the two nanowires 122 may be interconnected to each other via the nanoparticles 124 at the junction 126.

In other words, the plurality of nanowires 122 may be fused to each other through the plurality of nanoparticles 124. This may mean that the plurality of nanowires 122 may be interconnected to each other by means of the plurality of nanoparticles 124, rather than direct nanowire-nanowire joints.

In various embodiments, the nanoparticles 124 may also be fused to each other.

In various embodiments, the plurality of nanowires 122 and the plurality of nanoparticles 124 may be made of the same material (e.g., metal), which may encourage reaction between the nanowires 122 and the nanoparticles 124.

In the context of various embodiments, individual (or individually resolvable) nanoparticles 124 of the plurality of nanoparticles 124 may have a size (or diameter) of between about 5 nm and about 20 nm, for example, between about 5 nm and about 15 nm, between about 5 nm and about 10 nm, between about 10 nm and about 20 nm, or between about 8 nm and about 15 nm. Individual (or individually resolvable) nanoparticles 124 of the plurality of nanoparticles 124 may have the same (or uniform) size (or diameter).

In the context of various embodiments, individual (or individually resolvable) nanowires 122 of the plurality of nanowires 122 may have a length of between about 10 µm and about 50 µm, for example, between about 10 µm and about 40 µm, between about 10 µm and about 30 µm, between about 20 µm and about 30 µm, between about 20 µm and about 50 µm, between about 30 µm and about 50 µm, or between about 25 µm and about 40 µm. Individual (or individually resolvable) nanowires 122 of the plurality of nanowires 122 may have the same (or uniform) length.

In the context of various embodiments, individual (or individually resolvable) nanowires 122 of the plurality of nanowires 122 may have a diameter of between about 20 nm and about 200 nm, for example, between about 20 nm and about 100 nm, between about 20 nm and about 50 nm, between about 50 nm and about 200 nm, between about 100 nm and about 200 nm, between about 100 nm and about 150 nm, between about 100 nm and about 120 nm, between about 150 nm and about 200 nm, or between about 120 nm and about 150 nm. Individual (or individually resolvable) nanowires 122 of the plurality of nanowires 122 may have the same (or uniform) diameter.

In the context of various embodiments, individual (or individually resolvable) nanowires 122 of the plurality of nanowires 122 may have an aspect ratio of between about 50 and about 500, for example, between about 50 and about 250, between about 50 and about 100, between about 100 and about 500, or between about 100 and about 300.

In various embodiments, the nanowire network 120 may be at least substantially optically transparent. This may mean that the nanowire network 120 may be at least substantially transparent to visible light.

In various embodiments, the nanowire network 120 may be conductive (e.g., electrically conductive and/or thermally conductive).

In the context of various embodiments, the plurality of nanowires 122 may include a metal and/or the plurality of nanoparticles 124 may include a metal. The metal may be selected from the group consisting of copper (Cu), silver (Ag) and gold (Au). In various embodiments, the plurality of nanowires 122 and the plurality of nanoparticles 124 may include or may be made of the same metal.

In the context of various embodiments, the plurality of nanowires 122 and the plurality of nanoparticles 124 may include or consist essentially of copper (Cu).

In various embodiments, each nanowire 122 of the plurality of nanowires 124 may include a surfactant on a surface of the nanowire 122. The surfactant may prevent or minimize agglomeration of the plurality of nanowires 122. The surfactant may include a thiol or an amine.

Figure 1C:
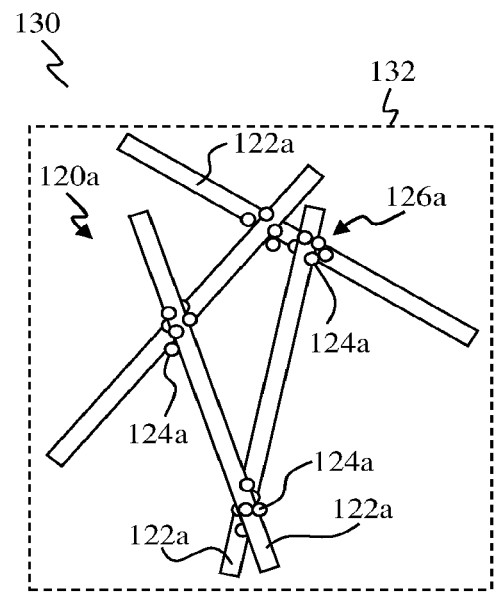
FIG. 1C shows a schematic top view of a transparent conductive electrode, according to various embodiments.

FIG. 1C shows a schematic top view of a transparent conductive electrode 130, according to various embodiments. The transparent conductive electrode 130 includes a nanowire network 120a, the nanowire network 120a including a plurality of conductive nanowires 122a interconnected to each other via a plurality of conductive nanoparticles 124a fused to the plurality of conductive nanowires 122a. This may mean that the nanowire network 120a may include interconnected conductive nanowires 122a.

In other words, a transparent conductive electrode 130 may be provided. The transparent conductive electrode 130 may have a conductive nanowire network 120a, which may include a plurality of interconnected conductive nanowires 122a, and a plurality of conductive nanoparticles 124a fused to the plurality of interconnected conductive nanowires 122a such that the plurality of interconnected conductive nanowires 122a are interconnected to each other via the plurality of conductive nanoparticles 124a.

In various embodiments, the plurality of conductive nanoparticles 124a may be fused to and in between the plurality of conductive nanowires 122a to interconnect the plurality of conductive nanowires 122a to each other via the plurality of conductive nanoparticles 124a at the junctions 126a between the plurality of conductive nanowires 122a. This may mean that conductive nanoparticles 124a may be present at a joint or junction 126a between two conductive nanowires 122a to fuse the two conductive nanowires 122a to each other. Therefore, two conductive nanowires 122a may be fused together with conductive nanoparticles 124a at a junction 126a so that the two conductive nanowires 122a may be interconnected to each other via the conductive nanoparticles 124a at the junction 126a.

In other words, the plurality of conductive nanowires 122a may be fused to each other through the plurality of conductive nanoparticles 124a. This may mean that the plurality of conductive nanowires 122a may be interconnected to each other by means of the plurality of conductive nanoparticles 124a, rather than direct nanowire-nanowire joints.

In various embodiments, the conductive nanoparticles 124a may also be fused to each other.

In various embodiments, the plurality of conductive nanowires 122a and the plurality of conductive nanoparticles 124a may be made of the same material (e.g., metal), which may encourage reaction between the conductive nanowires 122a and the conductive nanoparticles 124a.

In various embodiments, the nanowire network 120a may be electrically conductive and/or thermally conductive.

In various embodiments, the plurality of conductive nanowires 122a and the plurality of conductive nanoparticles 124a may be electrically conductive and/or thermally conductive.

In various embodiments, the nanowire network 120a may be at least substantially optically transparent. This may mean that the nanowire network 120a may be at least substantially transparent to visible light.

In the context of various embodiments, individual (or individually resolvable) conductive nanoparticles 124a of the plurality of conductive nanoparticles 124a may have a size (or diameter) of between about 5 nm and about 20 nm, for example, between about 5 nm and about 15 nm, between about 5 nm and about 10 nm, between about 10 nm and about 20 nm, or between about 8 nm and about 15 nm. Individual (or individually resolvable) conductive nanoparticles 124a of the plurality of conductive nanoparticles 124a may have the same (or uniform) size (or diameter).

In the context of various embodiments, individual (or individually resolvable) conductive nanowires 122a of the plurality of conductive nanowires 122a may have a length of between about 10 μm and about 50 μm, for example, between about 10 μm and about 40 μm, between about 10 μm and about 30 μm, between about 20 μm and about 30 μm, between about 20 μm and about 50 μm, between about 30 μm and about 50 μm, or between about 25 μm and about 40 μm. Individual (or individually resolvable) conductive nanowires 122a of the plurality of conductive nanowires 122a may have the same (or uniform) length.

In the context of various embodiments, individual (or individually resolvable) conductive nanowires 122a of the plurality of conductive nanowires 122a may have a diameter of between about 20 nm and about 200 nm, for example, between about 20 nm and about 100 nm, between about 20 nm and about 50 nm, between about 50 nm and about 200 nm, between about 100 nm and about 200 nm, between about 100 nm and about 150 nm, between about 100 nm and about 120 nm, between about 150 nm and about 200 nm, or between about 120 nm and about 150 nm. Individual (or individually resolvable) conductive nanowires 122a of the plurality of conductive nanowires 122a may have the same (or uniform) diameter.

In the context of various embodiments, individual (or individually resolvable) conductive nanowires 122a of the plurality of conductive nanowires 122a may have an aspect ratio of between about 50 and about 500, for example, between about 50 and about 250, between about 50 and about 100, between about 100 and about 500, or between about 100 and about 300.

In various embodiments, the transparent conductive electrode 130 may further include a substrate 132 on which the nanowire network 120a may be provided. The substrate 132 may include a flexible substrate. The substrate 132 may include an organic substrate. In the context of various embodiments, the substrate 132 may include at least one of polyimide (PI), polycarbonate (PC), polyethersulfone (PES), polyethyleneterephthalate (PET), polyethylenenaphthalate (PEN) or polyarylate (PAR).

In the context of various embodiments, the plurality of conductive nanowires 122a may include a metal and/or the plurality of conductive nanoparticles 124a may include a metal. The metal may be selected from the group consisting of copper (Cu), silver (Ag) and gold (Au). In various embodiments, the plurality of conductive nanowires 122a and the plurality of conductive nanoparticles 124a may include or may be made of the same metal.

In the context of various embodiments, the plurality of conductive nanowires 122a and the plurality of conductive nanoparticles 124a may include or consist essentially of copper (Cu).

In various embodiments, each conductive nanowire 122a of the plurality of conductive nanowires 124a may include a surfactant on a surface of the conductive nanowire 122a. The surfactant may prevent or minimize agglomeration of the plurality of conductive nanowires 122a. The surfactant may include a thiol or an amine.

In the context of various embodiments, the transparent conductive electrode 130 may be used in a flexible touch-screen or display.

In the context of various embodiments, the terms "fuse" and "fusing" may mean sintering, or joining together as an (single) entity. This may mean that there may not be clear or obvious boundary observable between two materials (or structures) when the two materials are fused to each other. Further, the two materials fused to each other may not be separate or distinct.

It should be appreciated that descriptions in the context of the nanowire network 120 and the transparent conductive electrode 130 may be correspondingly applicable to each other, and may also be correspondingly applicable in relation to the method for interconnecting nanowires, and vice versa.

Various embodiments may provide a copper nanowires-nanoparticles mixture for transparent conducting electrodes.

Various embodiments may provide a composition of copper nanowires (Cu NWs) and copper nanoparticles (Cu NPs) that may allow low temperature processing (for example, <250° C.) to be compatible with flexible organic substrates, with the required electrical conductivity and optical transmittance as a transparent electrode. Various embodiments may include or provide one or more of the following:

(i) To enable low temperature process, very small (for example, <10 nm) Cu nanoparticles (NPs) which may fuse between about 100° C. and about 250° C. may be used as the joining material between Cu nanowires to provide the electrical conductivity. Therefore, the process temperature may be decreased to less than about 250° C. Moreover, the nanoparticles formed joint lowers the contact resistance in comparison to a direct nanowire-nanowire joint. PCT/US2010/039069 describes a method for forming small Cu nanoparticles and the fabricated small copper nanoparticles that may be used in various embodiments described herein, the entire disclosure of which is incorporated herein by reference. Nevertheless, copper NPs which are produced by other methods may also be used as the joining material. However, the size and size distribution of the NPs employed in various embodiments may change the required process temperature and temperature profile for fusing the nanostructures or nanowires. From preliminary experiments, the inventors found that if NPs with 40-100 nm diameter are used, the process temperature required is in the range of 300-350° C. The blended composition of nanowires and nanoparticles as the fusing material of various embodiments may be employed as a transparent electrode.

(ii) Long (for example, up to 50 µm) Cu nanowires may be used in various embodiments, which may reduce the number of nanowire-nanowire contact and thus may increase the electrical conductivity (for example, for large area transparent conductive electrodes), but also may lead to a ductile mechanical property which may enable the flexibility required.

(iii) Mixing NWs and NPs in a low viscosity liquid (e.g., ethanol, isopropyl alcohol (IPA)) may encourage or cause the NWs to disperse uniformly, and may aid the NPs to coalesce at the junctions of contacting NWs. For this, the solvent should be fluid enough for the NPs to move in the dispersion. This mechanism may be explained thermodynamically that the NPs tend to reduce their high surface energy by fusing and increasing their contact area at joints, and the NPs have the required mobility to move. From another perspective, if the NPs are well-dispersed, for example, across a substrate, during the drying and washing process, more NPs may be placed at the junction of NWs and fused during the annealing process.

(iv) In order to achieve better dispersion of the mixture of NWs and NPs, one or more chemical treatments before mixing the NWs and NPs may be effective. As non-limiting examples, different types of thiol may be used as a surfactant to attach the diverse length of carbon chains on the surface of the NWs (e.g., Cu NWs). However, it should be appreciated that other kinds of chemicals may also be used to substitute for thiol which may make the NWs more stable and prevent or at least minimize agglomeration for better dispersion.

In various embodiments, copper (Cu) nanoparticles and copper (Cu) nanowires may be mixed with an appropriate (weight) ratio to address the problems described above. Cu nanowires are used as the main conductive and transparent material with Cu nanoparticles as a joining material between the nanowires.

Figure 2A:
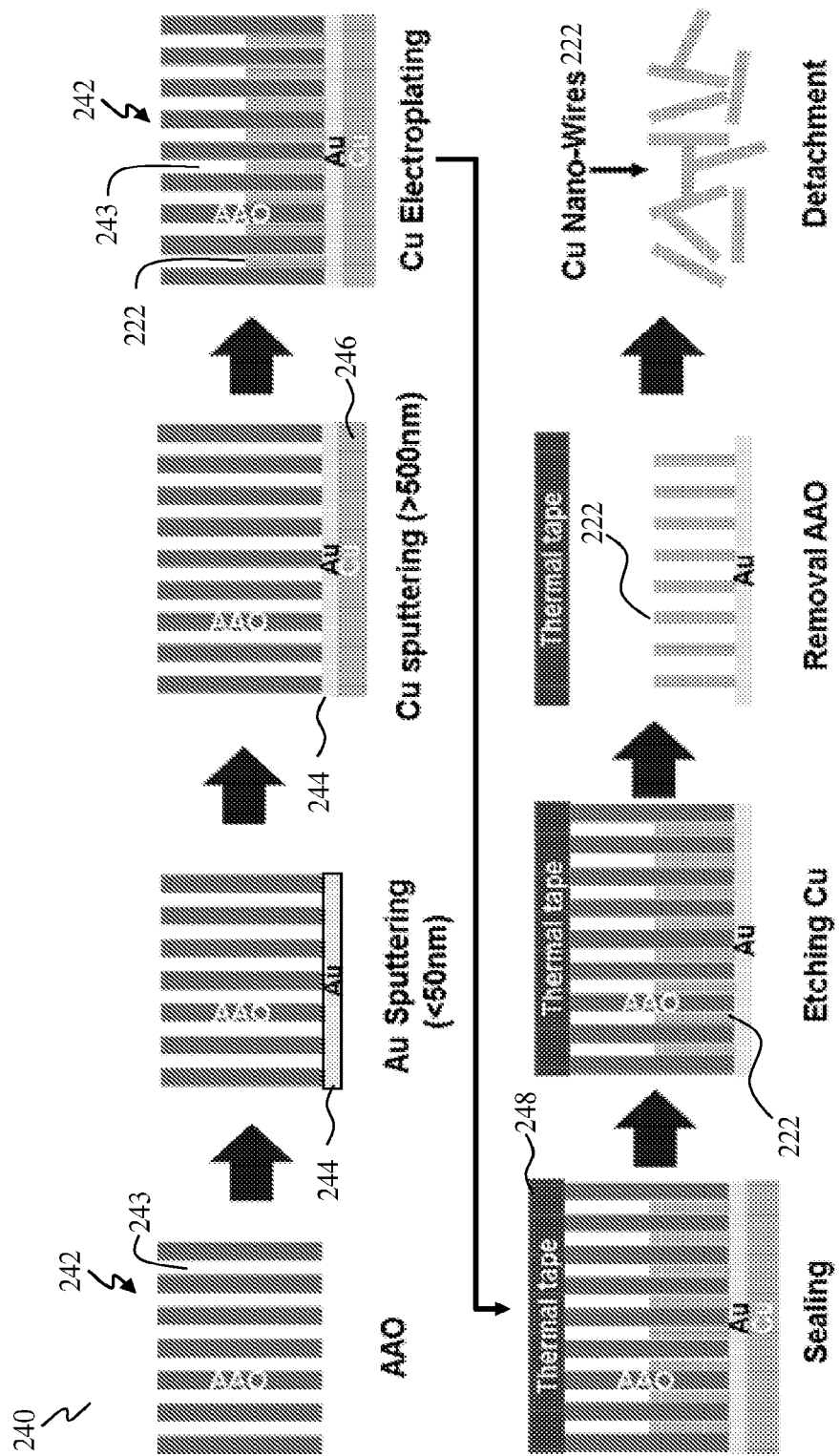
FIG. 2A shows, as cross-sectional views, various processing stages of a method of manufacturing copper (Cu) nanowires, according to various embodiments.

FIG. 2A shows, as cross-sectional views, various processing stages of a method 240 of manufacturing copper (Cu) nanowires (NWs), according to various embodiments, illustrating a procedure of manufacturing of Cu NWs using anodized aluminum oxide (AAO). In general, gold/copper (Au/Cu) layers may be deposited on the AAO as a seed layer for electroplating. Cu may subsequently be electroplated into the holes in the AAO. Then, the seed layer and the AAO may be etched out by an etchant as shown in FIG. 2A. Finally, the Cu NWs may be detached from the substrate. Therefore, Cu nanowires may be produced through electroplating using anodic aluminum oxide (AAO) as a template. As a result, uniform length of nanowires may be obtained. While it is described herein that the electroplating method with AAO as a template may be used to obtain the Cu nanowires, it should be appreciated that a chemical synthesis or a physical deposition process may be used instead.

As a non-limiting example, referring to FIG. 2A, an anodic aluminum oxide (AAO) template 242 may first be provided or prepared. The AAO template 242 may have a plurality of holes (or pores or channels) 243. The AAO template 242 may be sputtered with Au and Cu, where a 0.2 nm thick gold layer 244 and a 1 µm thick copper layer 246 may be obtained.

The AAO template 242 may then be attached onto a cathode (not shown) and 50 µm long Cu nanowires 222 may be electrochemical synthesized in the holes 243 of the AAO template 242.

The AAO template 242 may be attached to a thermal tape 248. The sputtered Cu layer 246 and Au layer 244 may be etched away by chemical etching processes. The AAO template 242 may be etched using a sodium hydroxide (NaOH) solution. As a result, free Cu nanowires 222 may be obtained.

The Cu nanowires 222 may be washed with ethanol, followed by isopropyl alcohol (IPA).

In various embodiments, optionally or if necessary, the nanowires 222 may be coated with thiol or amine group. In this way, thiol or amine as a surfactant may be coated on the nanowires 222.

Figure 2B:
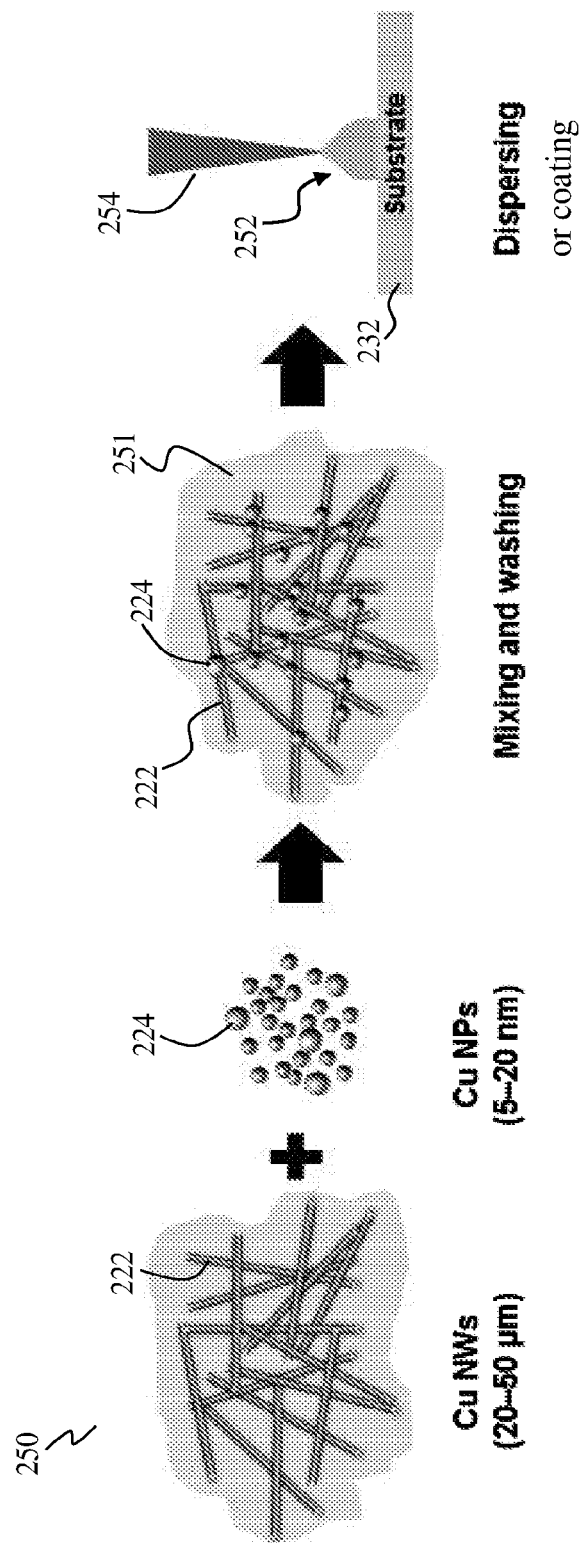
FIG. 2B shows a method of mixing copper nanoparticles (Cu NPs) and copper nanowires (Cu NWs), according to various embodiments.

Subsequently, Cu nanoparticles may be added to the nanowires 222 for mixing. The mixture may be added into a solution (or solvent) (e.g., isopropyl alcohol (IPA)) for dispersion and may be coated by spin coating, for example, onto a substrate. As a non-limiting example, referring to FIG. 2B illustrating a method of mixing of copper nanoparticles (Cu NPs) and copper nanowires (Cu NWs), Cu NPs 224 (e.g., having diameters of about 5-20 nm) are added to Cu NWs 222 (e.g., having lengths of about 20-50 μm) and the two materials may be mixed in an ultra-sonicator and washed with an alcohol base solution (e.g., isopropyl alcohol (IPA)) 251. Then, the solution (e.g., in the form of droplet 252) containing the mixture of Cu NWs 222 and Cu NPs 224, may be deposited, for example, from a dispenser 254, onto a substrate 232, and then dispersed on the substrate 232 by diverse methods, such as spin coating, mayor bar coating, roll to roll coating, spray coating, etc.

Figure 2C:
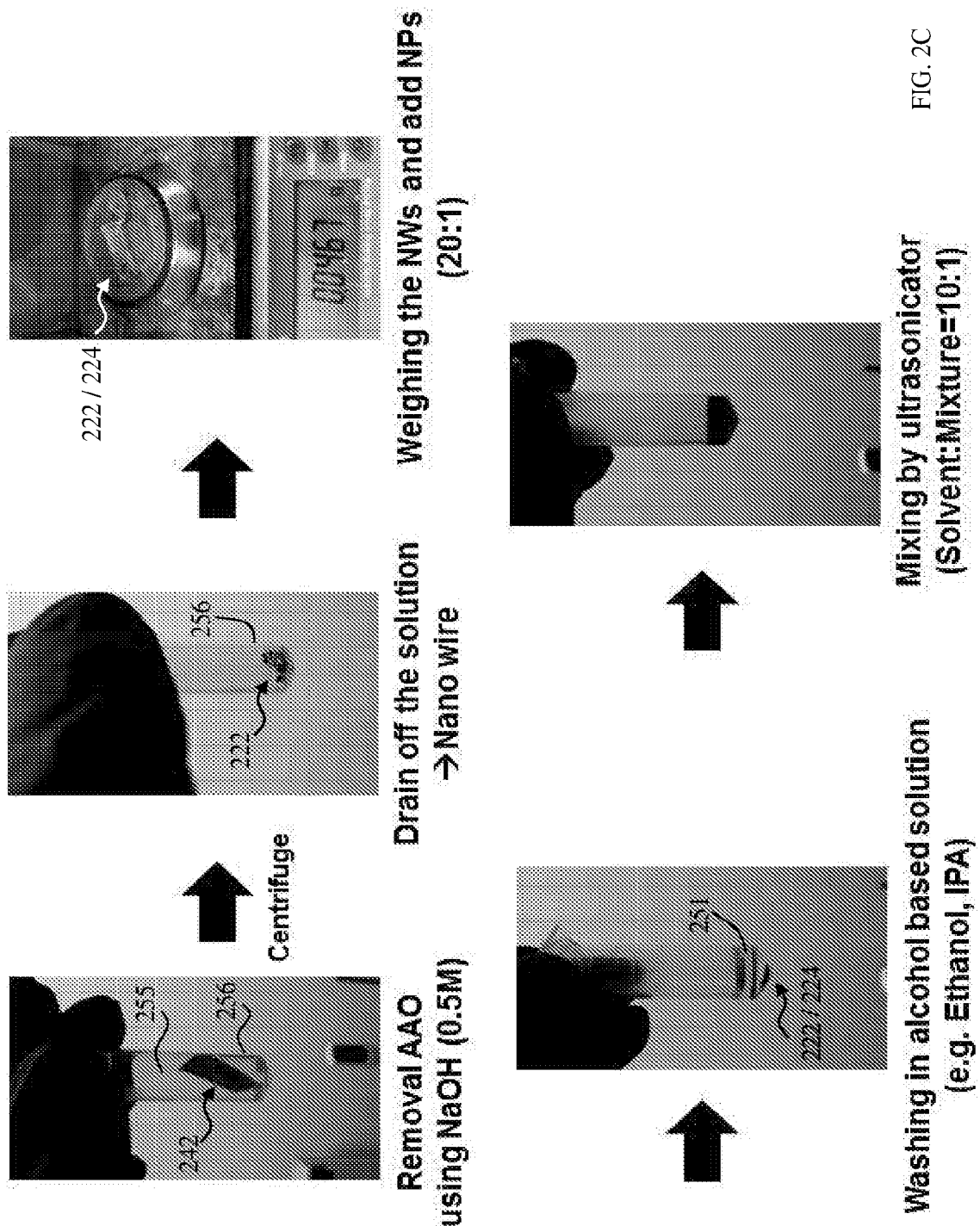
FIGS. 2C and 2D show examples of some steps of the processing method of various embodiments.
Figure 2D:
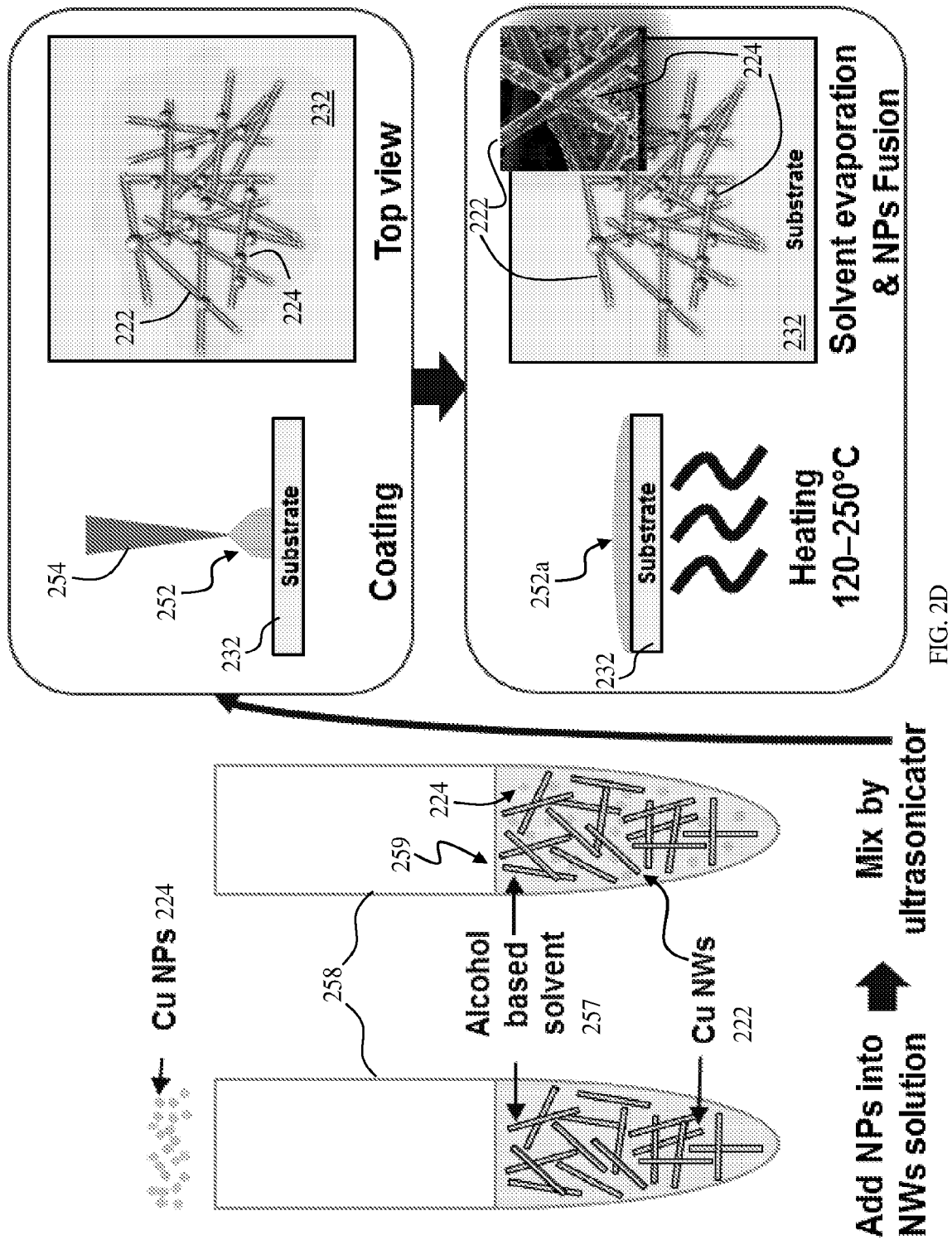

FIGS. 2C and 2D show examples of some steps of the processing method of various embodiments, using copper nanowires and copper nanoparticles as examples.

Referring to FIG. 2C, after forming copper nanowires using an AAO template 242, the AAO template 242 may be removed or etched by immersing the AAO template 242 with the copper nanowires in a solution 255 of sodium hydroxide (NaOH) (0.5 M concentration) inside a container 256. The solution 255 with the free copper nanowires may be centrifuged and then, the solution 255 may be drained off, leaving behind copper nanowires 222 inside the container 256. Then, an appropriate amount of the copper nanowires 222 may be weighed and copper nanoparticles 224 may then be added to the copper nanowires 222 until the desired weight ratio of the copper nanowires 222 to the copper nanoparticles 224 is obtained, for example about 20:1. The mixture of the copper nanowires 222 and the copper nanoparticles 224 may be washed in an alcohol based solution (e.g., ethanol, IPA) 251. The copper nanowires 222 and the copper nanoparticles 224 may be subsequently mixed in the solvent (alcohol based solution 251) using an ultrasonicator, where the weight ratio (or weight percentage) of solvent:mixture of copper nanowires 222 and copper nanoparticles 224 is 10:1.

Referring to FIG. 2D, copper (Cu) nanowires 222 may be dispersed in an alcohol based solvent 257 in a container 258. Copper (Cu) nanoparticles 224 may be added into the alcohol based solvent 257 and the solution 259 containing the Cu nanowires 222, the Cu nanoparticles 224 and the alcohol based solvent 257 may be mixed by an ultrasonicator. Then, the solution 259 or part thereof, after mixing, may be deposited or dispensed (e.g., in the form of droplet 252) from a dispenser 254 onto a substrate 232, and subsequently dispersed or coated as a layer 252a on the substrate 232. A heating process may then be carried out at a temperature between about 120° C. and about 250° C., for example, from below the substrate 232. As a result of the heating process, the alcohol based solvent 257 may be evaporated and the Cu nanoparticles 224 may fuse to each other and to the Cu nanowires 222.

It should be appreciated that the methods or steps described in the context of FIGS. 2A-2D respectively may be applicable also to other methods or steps of FIGS. 2A-2D, or may be combined in any manner.

FIG. 3A show a scanning electron microscope (SEM) image of copper nanowires 322 after manufacturing, for example, based on the method 240 described in the context of FIG. 2A. As shown in FIG. 3A, extremely long Cu NWs (>50 μm) 322 may be obtained. FIG. 3B shows a scanning electron microscope (SEM) image of copper nanowires 322a after dispersion on a substrate (not clearly shown).

Figure 4:
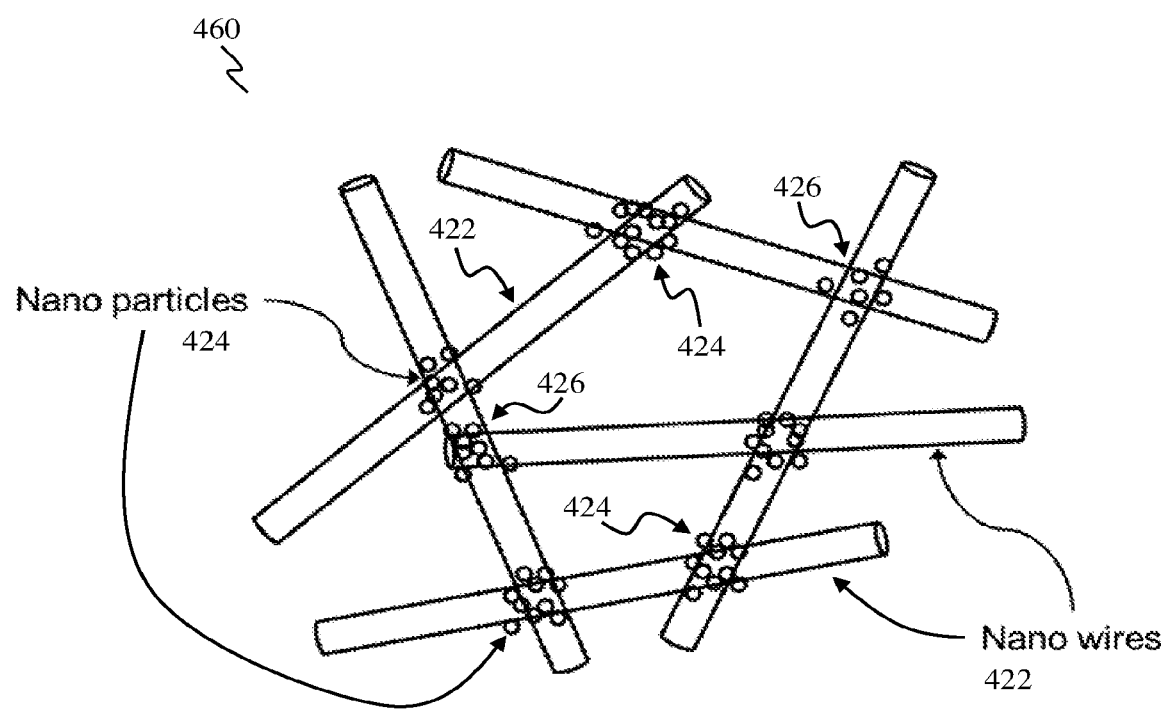
FIG. 4 shows a schematic diagram illustrating the mechanism in which copper (Cu) nanoparticles fuse at the junctions of copper (Cu) nanowires.

In various embodiments, after being dispersed onto a substrate, the copper nanowires and the nanoparticles may be subjected to a heating process. The heating process may assist or encourage joining of the Cu nanowires and the Cu nanoparticles, where the Cu nanoparticles may be fused to the Cu nanowires to interconnect the Cu nanowires via the Cu nanoparticles. FIG. 4 shows a schematic diagram 460 illustrating the mechanism in which copper (Cu) nanoparticles 424 fuse at the junctions 426 of copper (Cu) nanowires 422, so as to achieve the required electrical conductivity at low temperatures.

In various embodiments, Cu nanowires with a diameter of about 20-200 nm and a length of about 20-50 μm (aspect ratio: 100-500) and Cu nanoparticles with a diameter of about 5-20 nm are used. The weight ratio of Cu nanowires to Cu nanoparticles is from about 10:1 to about 20:1.

Examining a range of sizes, lengths, weight ratios of Cu nanowires and Cu nanoparticles, an optimal composition may be determined for the required electrical conductivity and optical transmittance (see, for example, FIGS. 5A, 5B, 5C and 6 to be described below).

Figure 5A:
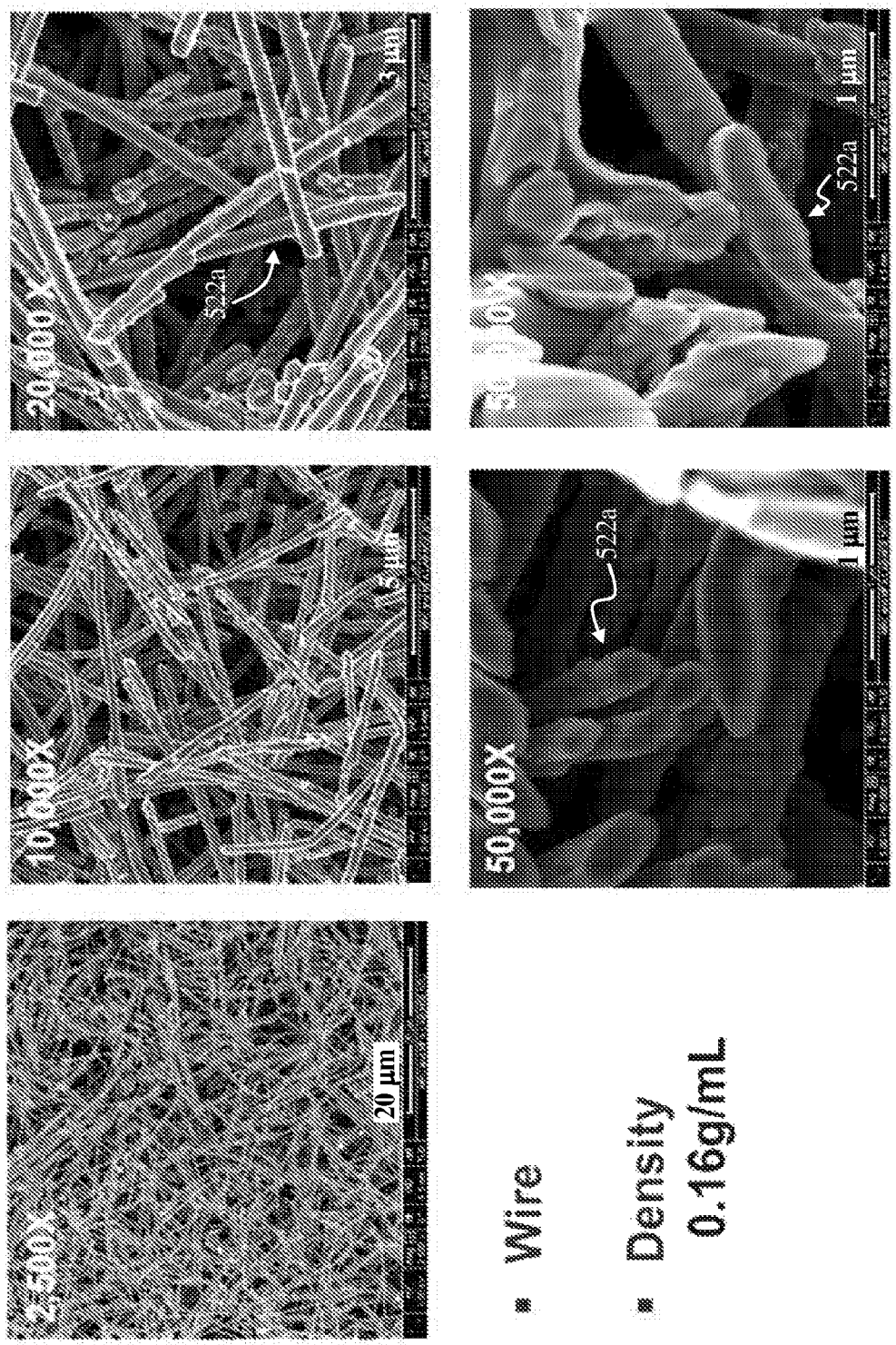
FIG. 5A shows scanning electron microscope (SEM) images of copper nanowires (Cu NWs), according to various embodiments.

FIG. 5A shows scanning electron microscope (SEM) images of copper nanowires (Cu NWs) 522a, illustrating samples made by only Cu nanowires 522a.

Figure 5B:
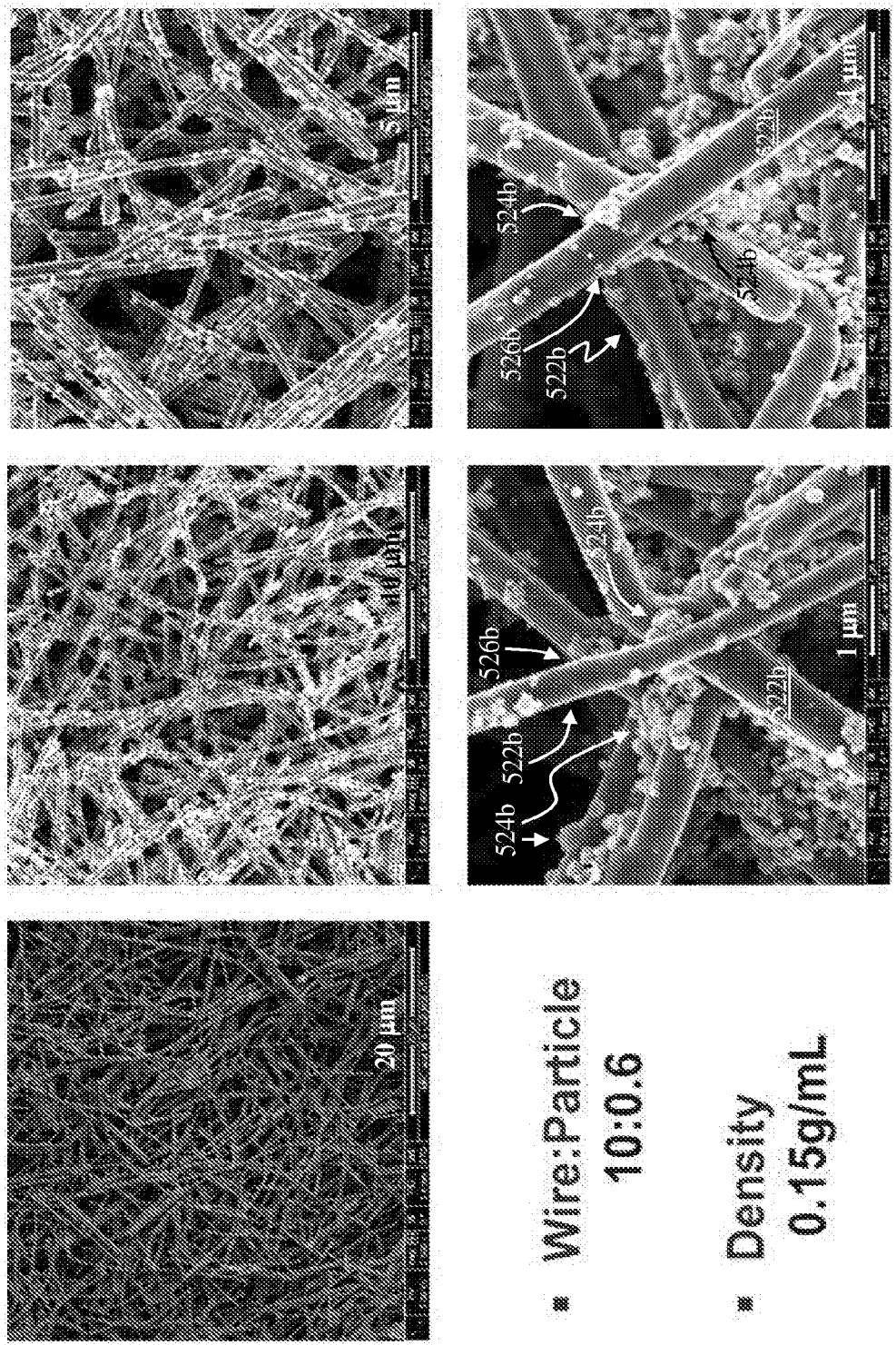
FIG. 5B shows scanning electron microscope (SEM) images of microstructures of mixed copper (Cu) nanowires and copper (Cu) nanoparticles which are annealed at 200° C., according to various embodiments.

FIG. 5B shows scanning electron microscope (SEM) images of microstructures of mixed copper (Cu) nanowires 522b and copper (Cu) nanoparticles 524b which are annealed at about 200° C., according to various embodiments. The weight ratio of the nanowires 522b to the nanoparticles 524b is 10:0.6. As may be observed in FIG. 5B, the Cu nanoparticles 524b are fused to the Cu nanowires 522b at junctions 526b between the Cu nanowires 522b. In this way, the Cu nanowires 522b may be interconnected to each other via Cu nanoparticles 524b at the junctions 526b.

Figure 5C:
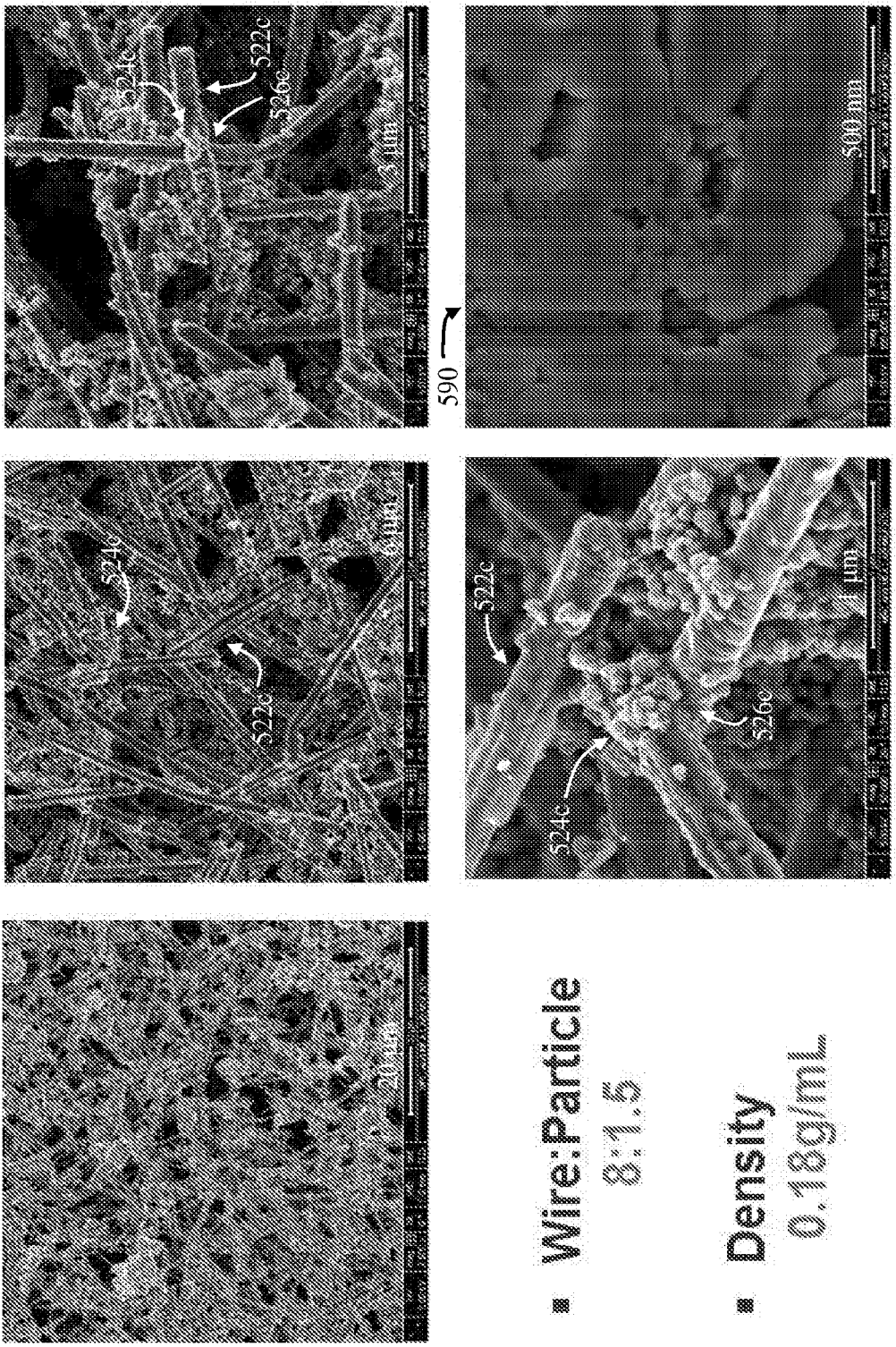
FIG. 5C shows scanning electron microscope (SEM) images of microstructures of mixed copper (Cu) nanowires and copper (Cu) nanoparticles, according to various embodiments.

FIG. 5C shows scanning electron microscope (SEM) images of microstructures of mixed copper (Cu) nanowires 522c and copper (Cu) nanoparticles 524c which are annealed at about 200° C., according to various embodiments. For obtaining the SEM images shown in FIG. 5C, three drops of the mixture of copper (Cu) nanowires 522c and copper (Cu) nanoparticles 524c were provided on a substrate for coating the substrate. The weight ratio of the nanowires 522c to the nanoparticles 524c is 8:1.5. As may be observed in FIG. 5C, the Cu nanoparticles 524c are fused to the Cu nanowires 522c at junctions 526c between the Cu nanowires 522c. In this way, the Cu nanowires 522c may be interconnected to each other via Cu nanoparticles 524c at the junctions 526c. The SEM image 590 shows a cross sectional view of the mixed copper (Cu) nanowires 522c and copper (Cu) nanoparticles 524c using FIB (Focused Ion Beam).

Figure 6:
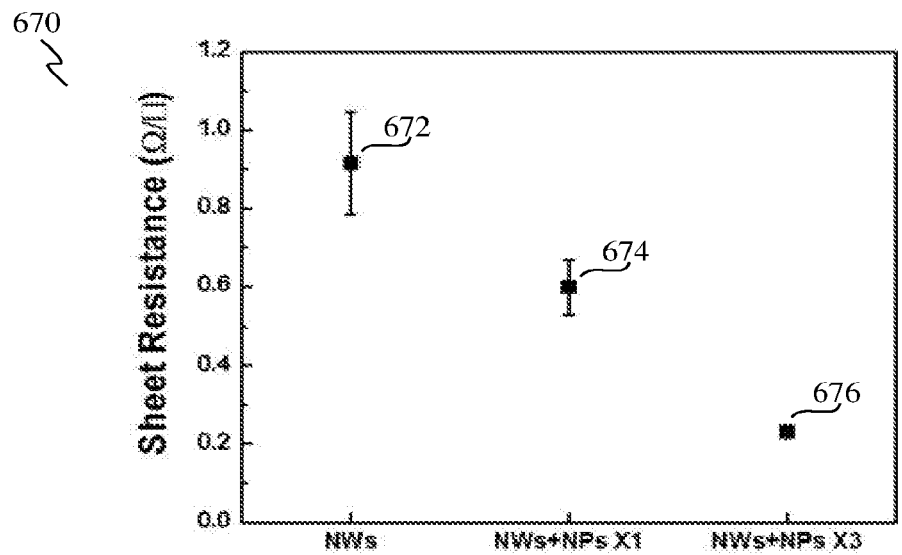
FIG. 6 shows a plot of sheet resistance for various copper (Cu) nanostructures mixtures.

FIG. 6 shows a plot 670 of sheet resistance (unit: ohm per square, Ω/□) for various copper (Cu) nanostructures mixtures on polyimide substrates. Plot 670 shows result 672 for copper nanowires (NWs), result 674 for copper nanowires with Cu nanoparticles fused to the nanowires where one drop of the mixture of copper (Cu) nanowires and copper (Cu) nanoparticles was provided on a polyimide substrate (NWs+NPs X1, where "X1" represents one drop) and result 676 for copper nanowires with Cu nanoparticles fused to the nanowires where three drops of the mixture of copper (Cu) nanowires and copper (Cu) nanoparticles were provided on a polyimide substrate (NWs+NPs X3, where "X3" represents three drops). As shown in FIG. 6, the sheet resistance may decrease with the addition of nanoparticles to the nanowires and may further decrease as the amount of nanoparticles is increased.

Figure 7A:
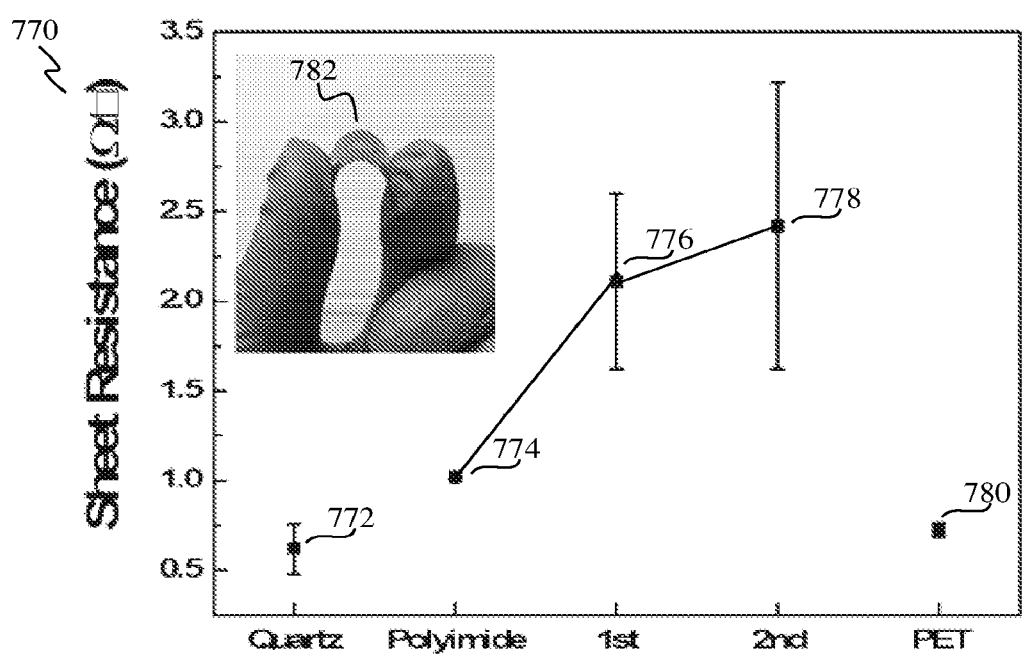
FIG. 7A shows a plot of sheet resistance of fused copper (Cu) nanowires-nanoparticles on different substrates.

FIG. 7A shows a plot 770 of sheet resistance of fused copper (Cu) nanowires-nanoparticles on different substrates. The composition rate of the mixture of Cu NWs to the Cu NPs is about 20(NW):1(NP). Plot 770 shows the sheet resistances of Cu nanowires and Cu nanoparticles composite on different substrates such as result 772 for quartz, result 774 for polyimide, result 776 for polyimide (same substrate corresponding to result 774) and after bending of the polyimide sample (indicated as "1st" to refer to one (first) time of bending), result 778 for polyimide (same substrate corresponding to results 774, 776) and after bending of the polyimide sample (indicated as "2nd" to refer to second time of bending) and result 780 for polyethyleneterephthalate (PET). In various embodiments, electrical conductivity is maintained even after preliminary flexing of the polyimide substrate (e.g., 782), as may be observable from results 776, 778.

Figure 7B:
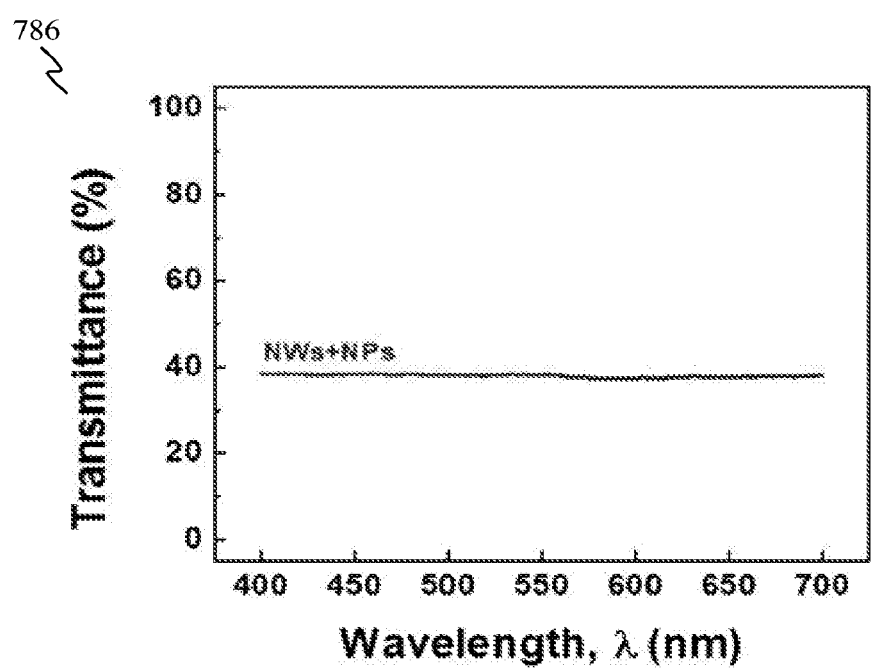
FIG. 7B shows a plot of optical transmittance of a transparent copper nanowires (Cu NWs) with copper nanoparticles (Cu NPs) electrode.

FIG. 7B shows a plot 786 of optical transmittance of a transparent copper nanowires (Cu NWs) with copper nanoparticles (Cu NPs) electrode, measured with an ultraviolet-visible (UV-vis) spectrometer, for a mix of Cu nanowires-nanoparticles having a composition rate of Cu NWs to Cu NPs of about 20(NW):1(NP). An optical transmittance of about 40% may be obtained.

Figure 8A:
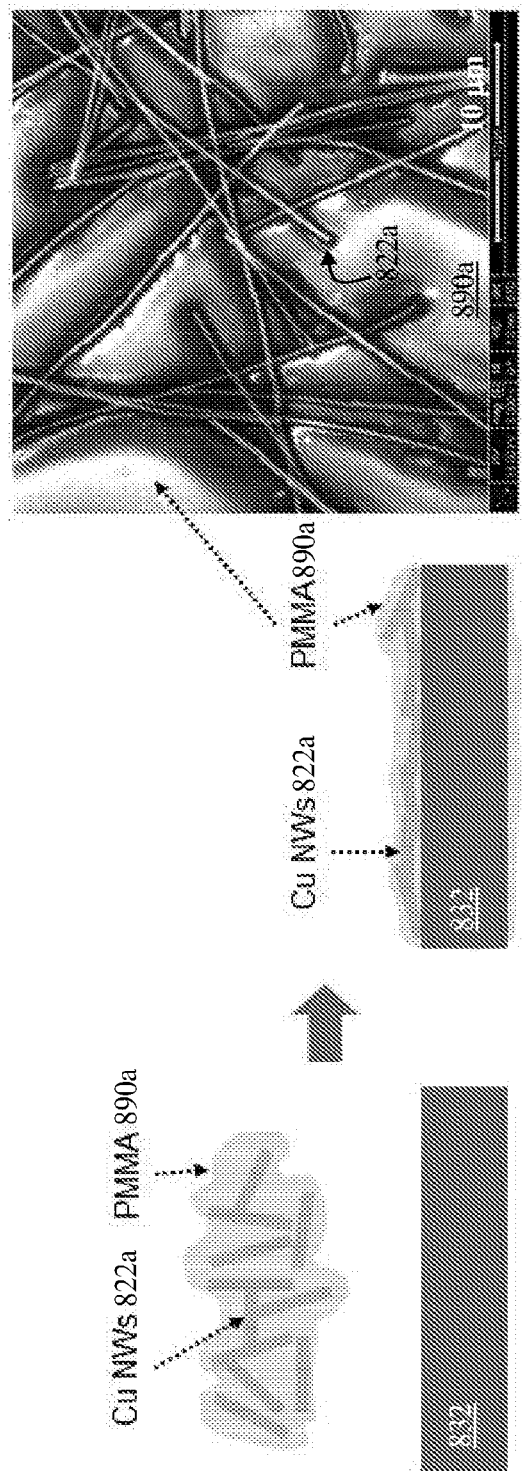
FIG. 8A shows a schematic diagram illustrating a solution of polymethylmethacrylate (PMMA) with copper (Cu) nanowires dispensed onto a substrate, according to various embodiments.
Figure 8B:
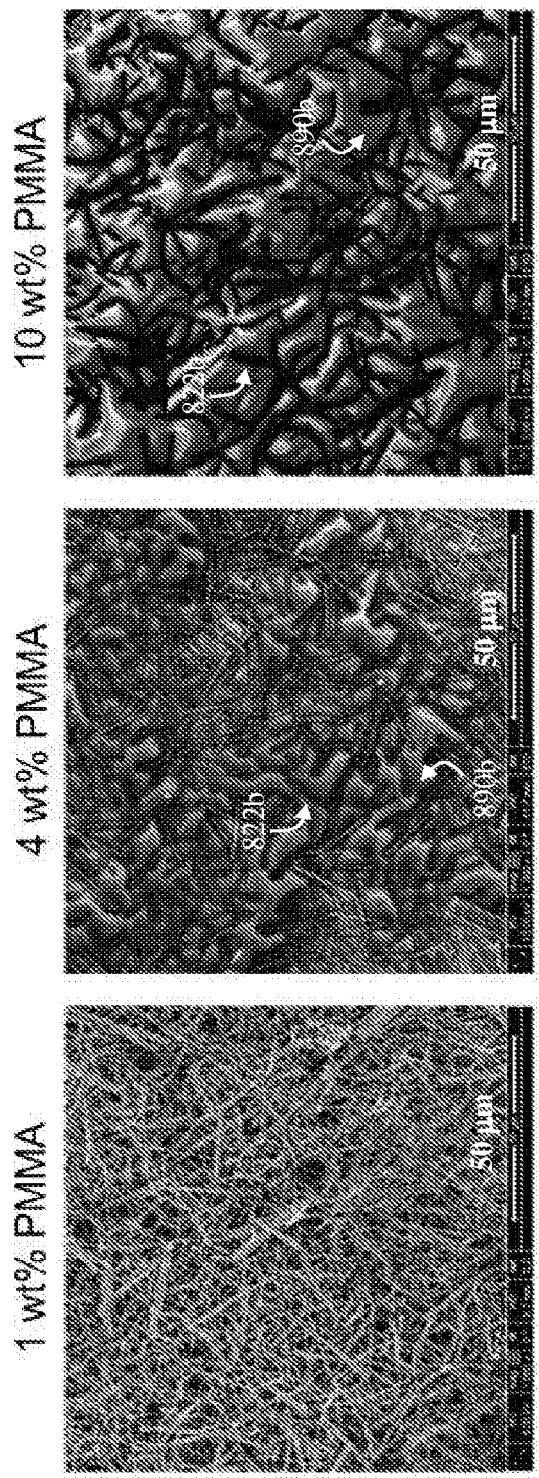
FIG. 8B shows scanning electron microscope (SEM) images illustrating the effects of different concentrations of polymethylmethacrylate (PMMA) for dispersion.
Figure 8C:
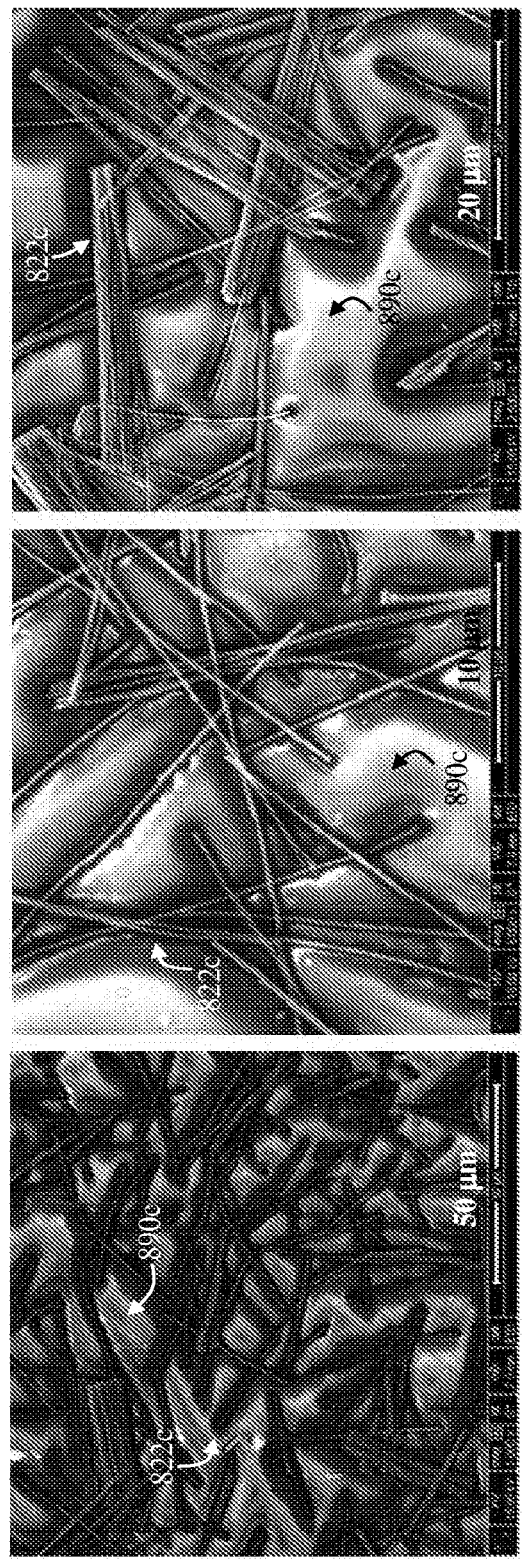
FIG. 8C shows scanning electron microscope (SEM) images of copper (Cu) nanowires in polymethylmethacrylate (PMMA).

In various embodiments, some polymers (such as polymethylmethacrylate (PMMA), polystyrene, etc.) may aid in the dispersion of the nanostructures (by improving the dispersion properties) and may lead to a smooth surface as shown by the SEM images in FIGS. 8A, 8B and 8C. The use of PMMA as a matrix may provide advanced or improved coating uniformity, and higher adhesion on a substrate (e.g., glass substrate). Therefore, in various embodiments, Cu NWs and Cu NPs may be mixed in a solution containing a polymer such as PMMA.

FIG. 8A shows a schematic diagram illustrating a solution of polymethylmethacrylate (PMMA) 890a with copper (Cu) nanowires 822s dispensed onto a substrate 832, according to various embodiments. No Cu NPs were included.

FIG. 8B shows scanning electron microscope (SEM) images illustrating the effects of different concentrations (weight %) of polymethylmethacrylate (PMMA) 890b for dispersion of nanowires 822b. No Cu NPs were included.

FIG. 8C shows scanning electron microscope (SEM) images of copper (Cu) nanowires in polymethylmethacrylate (PMMA). No Cu NPs were included. 4 wt % PMMA (molecular weight of 996K) in chloroform solvent was used and the PMMA solution 890c containing nanowires 822c dispersed therein was spin-coated at about 2000 rpm onto a glass substrate, and then annealed at about 350° C. The processing further included treatment of the nanowires 822c with a thiol to prevent or minimise agglomeration of the nanowires 822c, for example, treatment with octanethiol where the nanowires 822c may be stirred in the thiol at about 500 rpm at about 80° C. Generally, treatment with a surfactant such as a thiol or amine may be carried out before mixing with nanoparticles. As a non-limiting example, the entire process flow may be as follows: Nanowire (raw material)→Treatment with thiol or amine→Adding nanoparticles→Mixing with matrix (e.g., PMMA)→Dispersing (coating)→Heating (annealing).

As non-limiting examples, different molecular weights (MW) of PMMA (e.g., 112 k, 120 k, 996K) and/or concentrations (e.g., 0.5%-10%, e.g., 0.1-0.4 wt %), and the concentration of nanowires in PMMA or solvent (e.g., 5%-20%) may be used. Dispersion property may be diverse or different according to the concentration and/or MW of PMMA. For embodiments employing PMMA as a matrix, the solvent used for PMMA may include dimethylformamide (DMF) (boiling point ~153° C.), chloroform (boiling point ~61° C.), or toluene (boiling point ~110° C.).

In various embodiments, conductive polymers such as poly(3,4-ethylenedioxythiophene):poly(styrene sulfonate) (PEDOT:PSS) may also be employed as the matrix to improve the electrical properties as occasion demands.

Figure 9A:
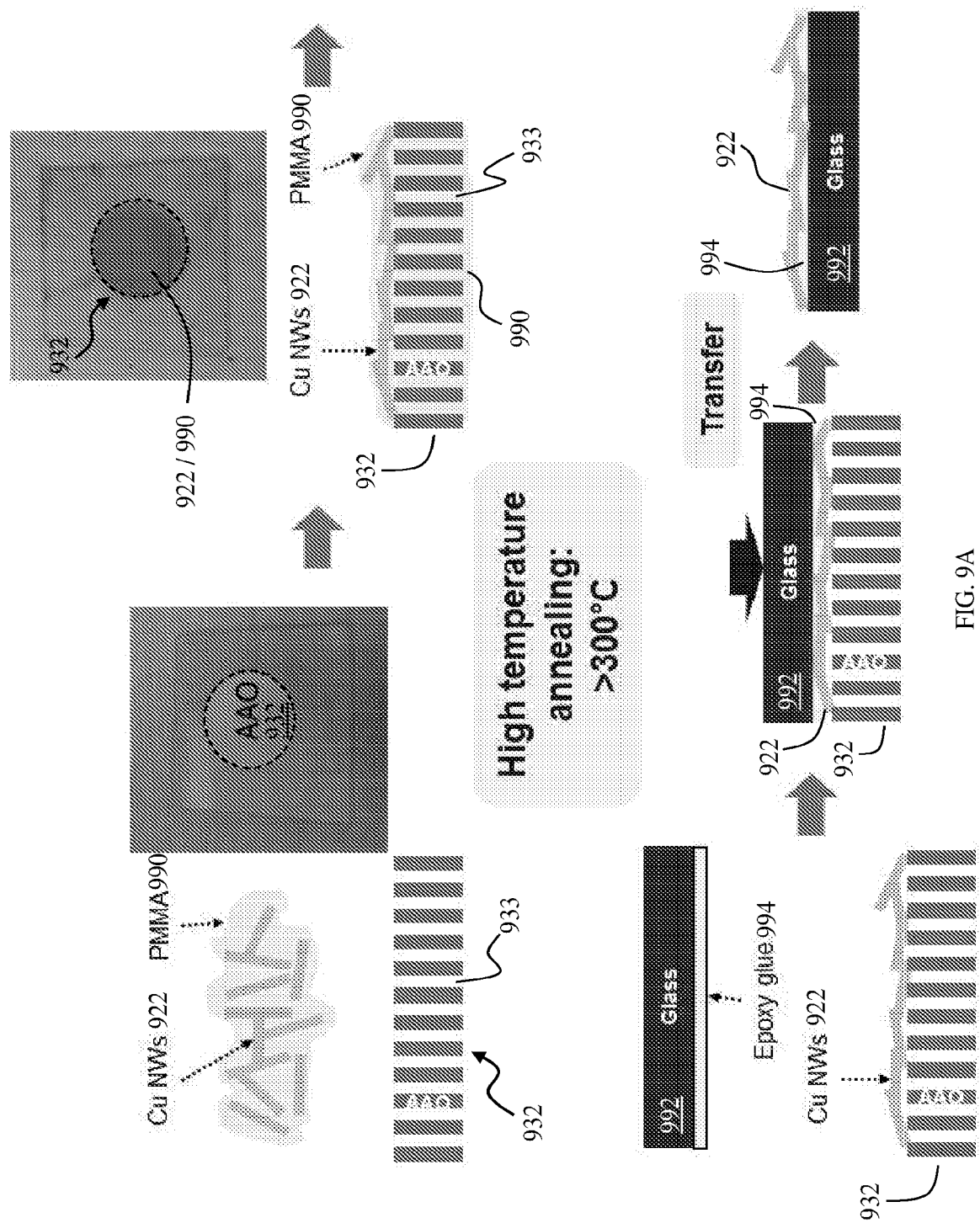
FIG. 9A shows schematic diagrams illustrating the use of an anodic aluminium oxide as a substrate in the method of various embodiments.

FIG. 9A shows schematic diagrams illustrating the use of an anodic aluminium oxide 932 as a substrate in the method of various embodiments. A solution containing PMMA (as matrix) 990 and copper (Cu) nanowires 922 may be provided on the anodic aluminium oxide 932. Over time, the PMMA 990 may flow through the holes (or channels) 933 of the anodic aluminium oxide 932, out of the anodic aluminium oxide 932 on the side of the anodic aluminium oxide 932 opposite to that having the Cu nanowires 922. As a result, only minimal or residual PMMA 990 may remain with the Cu nanowires 922. A substrate (e.g., glass) 992 having an adhesive (e.g., epoxy glue) 994 may be used to transfer the Cu nanowires 922 remaining on the anodic aluminium oxide 932 onto the substrate 992. Therefore, in various embodiments, the anodic aluminium oxide 932 may act as an intermediate substrate for transferring the Cu nanowires 922 to the (final) substrate 992. While FIG. 9A does not show the addition of Cu nanoparticles, it should be appreciated that Cu nanoparticles may be added to the nanowires 922 before mixing with the matrix (PMMA 990).

In various embodiments, when anodic aluminium oxide 932 is used as a substrate, the annealing temperature employed may go higher than about 300° C. because the melting temperature of AAO is about 2,000° C. While PMMA is used to improve the dispersion of the nanowires, the presence of PMMA may adversely affect the performance of a transparent electrode and so the preferred way is to remove/reduce the PMMA, for example, by heating. The annealing temperature depends on the molecular weight and concentration of the PMMA, however, a temperature of about 400° C. may be an optimum treatment temperature. The annealing process may be carried out after the second step illustrated in FIG. 9A, meaning after dispersion of the nanowires 922 onto the anodic aluminium oxide 932 and prior to transferring to the substrate 992. In other words, the process flow may include dispersion of NWs onto the AAO→annealing→transferring.

Figure 9B:
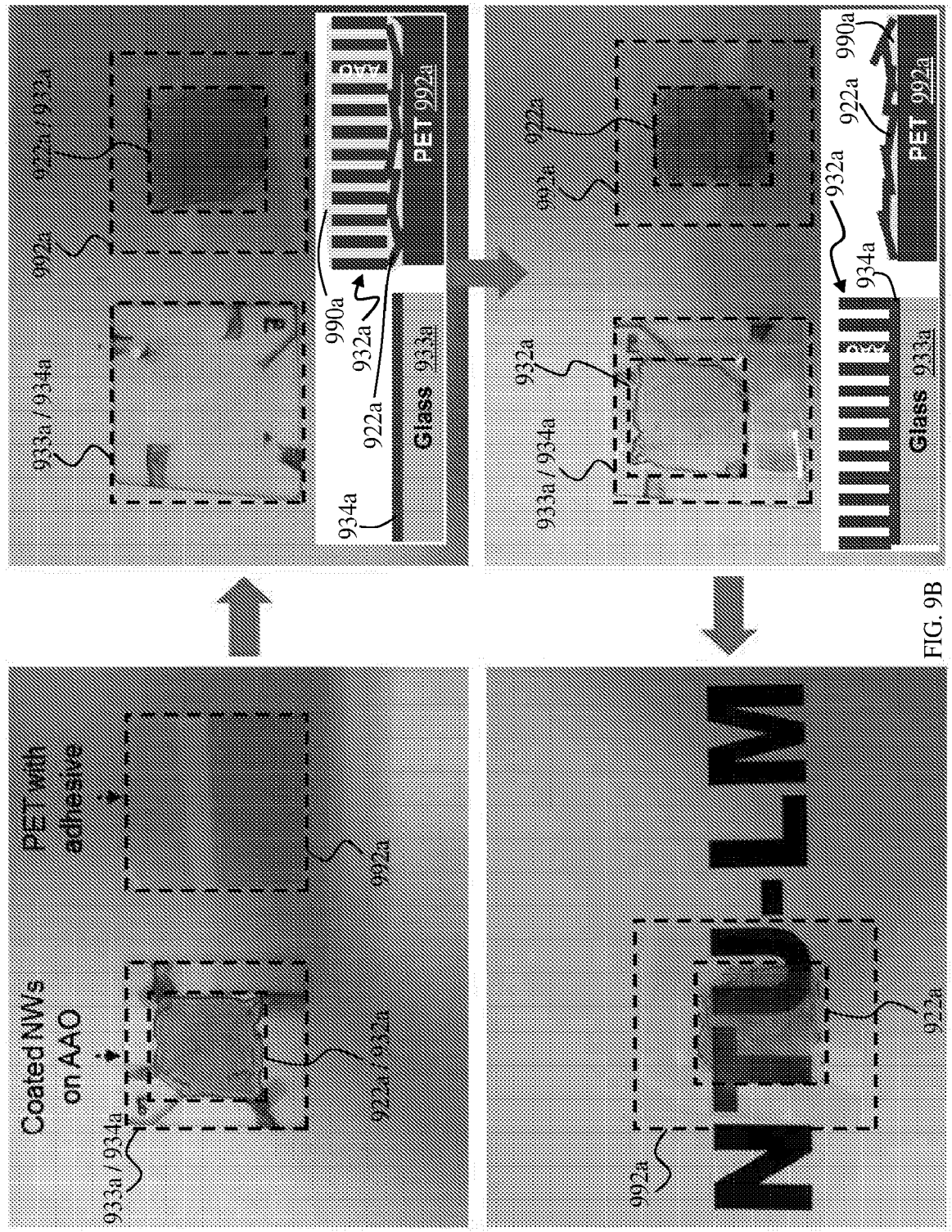
FIG. 9B shows photographs illustrating the transfer of nanowires from an anodic aluminium oxide to another substrate, according to various embodiments.

FIG. 9B shows photographs illustrating the transfer of nanowires (e.g., Cu nanowires) 922a coated on an anodic aluminium oxide 932a from the anodic aluminium oxide 932a to another substrate, e.g., PET 992a with adhesive, according to various embodiments. As shown in FIG. 9B, the anodic aluminium oxide 932a with coated nanowires 922a (with PMMA) may first be provided affixed to a glass substrate 933a having an adhesive tape 934a. The nanowires 922a (with PMMA 990a) and the anodic aluminium oxide 932a may then be transferred to the PET 992a. The anodic aluminium oxide 932a may then be transferred back to the glass substrate 933a with the adhesive tape 934a, leaving behind the nanowires 922a (possibly with some residual PMMA 990a) on the PET 992a. As may be observed in FIG. 9B, the PET 992a having the nanowires 922a may be optically transparent.

Figure 9C:
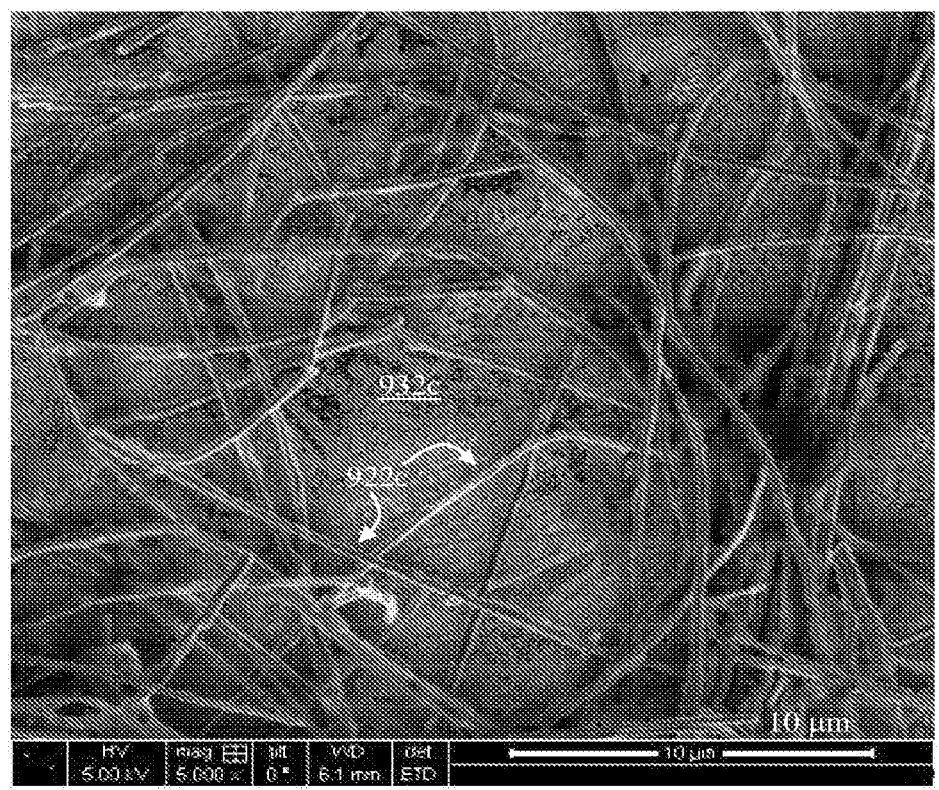
FIG. 9C shows a scanning electron microscope (SEM) image of nanowires on an anodic aluminium oxide (AAO) substrate.

FIG. 9C shows a scanning electron microscope (SEM) image of well-dispersed nanowires 922c on an anodic aluminium oxide (AAO) substrate 932c. While present, nanoparticles are not clearly shown in the SEM image. The weight ratio of the nanowires 922c to the nanoparticles was about 20:1, the solvent used was IPA and the annealing temperature was about 300° C.

Figure 10:
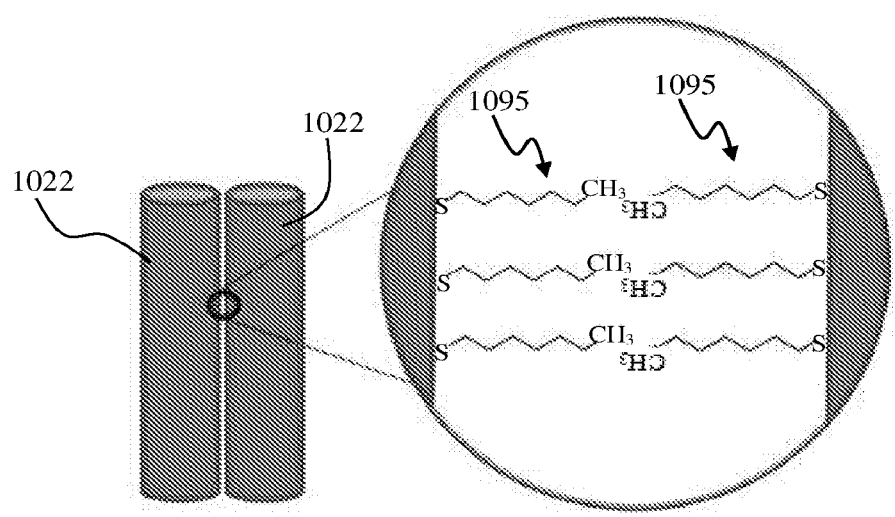
FIG. 10 shows a schematic diagram illustrating thiol molecules attached on the surface of nanowires (NWs).

Some functional groups (e.g., thiol and amine) may act as a surfactant to enhance the dispersion property of the mixture. The effect of adding some thiol or amine into the mixture of NPs and NWs before dispersion may be determined, because these molecules attach on the surface of the NWs (see FIG. 10 illustrating thiol molecules 1095 attached on the surface of nanowires (NWs) (e.g., Cu NWs)) 1022, where these molecules 1095 work like arms causing the NWs 1022 to repel each other and prevent agglomeration.

In various embodiments, PMMA may be the dispersion matrix and thiol may be the surfactant. PMMA may be used as the dispersion matrix to hold the Cu nanowires uniformly across the substrate to prevent or at least minimise agglomeration of the Cu nanowires and improves the conductivity of the thin films. The PMMA may be subsequently removed.

As described above, various embodiments may include or provide one or more of the following:

(i) A much lower process temperature (about 100-250° C.) to form the conductive electrode due to the fusion temperature of small copper (Cu) nanoparticles used. This is a major improvement over existing technology which has a higher processing temperature (300-500° C.). The lower temperature (<250° C.) for various embodiments may enable compatibility of the process with flexible organic substrates.

(ii) Long, uniform and high aspect ratio (about 50-250) Cu nanowires may be used in the composition. This may improve flexibility while maintaining the electrical conductivity and the optical transmittance required.

(iii) Cu may be used as both the conductive and joining materials. For example, by to using only Cu as an electrode material, aggressive inter-diffusion and reaction between heterogeneous materials may be avoided.

Various embodiments may be related to or focused on the touchscreen and display applications. In order to apply to flexible touchscreens or displays, the process temperature has to be lower than 250° C., while the electrical and optical properties have to be maintained after repeated bending or straining. The global market for transparent conductive coatings is expected to grow to nearly $7.1 billion by 2018, and for flexible displays, reached $39.1 million in 2012.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A nanowire network comprising:
a plurality of nanowires having an aspect ratio of about 50 to about 500 interconnected to each other via a plurality of metal nanoparticles fused to the plurality of nanowires at junctions where nanowires come together, the metal nanoparticles being further fused to each other, and a weight ratio of the plurality of nanowires to the plurality of metal nanoparticles is between about 5:1 and about 20:1;
wherein the metal nanoparticles have a diameter between about 5 nm and about 20 nm before becoming fused to the nanowires and to each other.

2. The nanowire network of claim 1, wherein each nanowire of the plurality of nanowires has a length between about 10 μm and about 50 μm.

3. The nanowire network of claim 1, wherein each nanowire of the plurality of nanowires has a diameter between about 20 nm and about 200 nm.

4. The nanowire network of claim 1, wherein the plurality of nanowires and the plurality of metal nanoparticles are conductive.

5. The nanowire network of claim 1, wherein the nanowire network is optically transparent.

6. The nanowire network of claim 1, wherein the plurality of nanowires comprises a metal.

7. The nanowire network of claim 6, wherein the metal is selected from the group consisting of copper, silver and gold.

8. The nanowire network of claim 6, wherein the plurality of nanowires and the plurality of metal nanoparticles comprise copper.

9. The nanowire network of claim 8, wherein the plurality of nanowires and the plurality of metal nanoparticles consist essentially of copper.

10. The nanowire network of claim 6, wherein the plurality of nanowires and the plurality of metal nanoparticles each comprise the same metal.

* * * * *